(12) United States Patent
Mills et al.

(10) Patent No.: US 7,317,732 B2
(45) Date of Patent: Jan. 8, 2008

(54) METHOD AND APPARATUS FOR HANDLING LINK SUSPEND PULSE AND SILENT LINE STATE TRANSITIONS OF A NETWORK DEVICE

(75) Inventors: Andrew Mills, Coto de Caza, CA (US); Ralph Andersson, Nevada City, NV (US); Anthony Worsham, Pittsburgh, PA (US); Michael Nootbaar, Sun City, CA (US); David Rosky, Nevada City, NV (US); Michael Behrin, Nevada City, NV (US)

(73) Assignee: Teridian Semiconductor, Corp., Irvine, CA (US)

( * ) Notice: Subject to any disclaimer, the term of this patent is extended or adjusted under 35 U.S.C. 154(b) by 1006 days.

(21) Appl. No.: 10/263,465

(22) Filed: Oct. 2, 2002
(Under 37 CFR 1.47)

(65) Prior Publication Data
US 2003/0206564 A1 Nov. 6, 2003

Related U.S. Application Data

(63) Continuation-in-part of application No. 09/676,040, filed on Sep. 28, 2000, now Pat. No. 6,795,450.

(60) Provisional application No. 60/380,955, filed on May 15, 2002, provisional application No. 60/326,520, filed on Oct. 2, 2001.

(51) Int. Cl.
  *H04L 12/413* (2006.01)
  *H04L 12/26* (2006.01)
  *G06F 1/00* (2006.01)
(52) U.S. Cl. ............... 370/445; 370/463; 370/465; 370/509; 713/320
(58) Field of Classification Search .......... 370/433, 370/446, 465, 503, 522; 375/373, 376
See application file for complete search history.

(56) References Cited

U.S. PATENT DOCUMENTS 5,805,597 A * 9/1998 Edem .................. 370/445
6,600,755 B1 * 7/2003 Overs et al. ............ 370/465

* cited by examiner

*Primary Examiner*—Chau Nguyen
*Assistant Examiner*—Soon D. Hyun
(74) *Attorney, Agent, or Firm*—The Heckler Law Group, PLC

(57) ABSTRACT

A method and apparatus for handling data during link suspend pulse and the silent line state of a network device operating in a low power link suspend mode is presented. Accordingly, a new generation of network devices capable of operating in both the full power operational mode of prior art network devices, and a low power "link-suspend" operational mode are presented. The low power "link-suspend" (LS) mode reduces the power consumption of a LAN communications link at the physical layer by eliminating the need to continuously transmit standard idles to maintain link between two linked partners. In the LS mode, a low duty cycle "link-suspend-packet" (LSP) is transmitted between periods of silent line state (SLS). During the SLS, which is a non-data transmission period, the transmitter may be turned off to conserve power therefore preventing the receiver from immediately knowing the phase of an incoming data. Thus, in order to prevent loss of data, the LSPs serve to maintain link and provide information necessary to train the receiver loops so that they can quickly lock onto the incoming data. LSPs are specially constructed so that they can serve as part of the data preamble when the network devices are operating in the link suspend mode. Therefore, the nature of the LSPs is that they are compatible with the standard protocol requirements for data transmission.

30 Claims, 13 Drawing Sheets

| | | | | | | | | |
|---|---|---|---|---|---|---|---|---|
| Suspend Msg ID 802 | Reserved 828 | | | | | | | |
| Link Partner Status 804 | Rsvd 828 | LP WakeUp Code (0:2) 808 | LP LSPWidth (0:3) 812 | LP LSPExp (0:1) 816 | LP LSPPeriod (0:1) 818 | Rsvd 828 | LP LS_RX_EN 822 | LP LSAV 826 | Rsvd 828 |
| LS Control 806 | LSAN 807 | WakeUp Code (0:2) 810 | LSPWidth (0:3) 734 | LSPExp (0:1) 814 | LSPPeriod (0:1) 732 | Rsvd 828 | LS_RX_EN 820 | LSAV 824 | LS_TX_EN 829 |

LSMsgID (0:10) 830

METHOD AND APPARATUS FOR HANDLING LINK SUSPEND PULSE AND SILENT LINE STATE TRANSITIONS OF A NETWORK DEVICE

This application claims priority of U.S. Provisional Application No. 60/380,955 filed on May 15, 2002, entitled "Method and Apparatus for Handling Link Suspend Pulse and Silent Line State Transitions of a Network Device," and of U.S. Provisional Application No. 60/326,520 filed on Oct. 2, 2001, entitled "Method and Apparatus for Transparent Implementation of Link-Suspend Capabilities in Network Devices," and is a Continuation-In-Part of U.S. application Ser. No. 09/676,040, filed on Sep. 28, 2000 now U.S. Pat No. 6,795,450, entitled "Method and Apparatus for Supporting Physical Layer Link-Suspend Operation Between Network Devices," the specifications of which are herein incorporated by reference.

BACKGROUND OF THE INVENTION

1. Field of the Invention

This invention relates to the field of computer network point to point data communications, and more particularly to communications links that normally use constant idle bit streams between packet transmissions.

2. Background a. Communications Networks

There are many different types of networks, network systems, and network devices for sharing files and resources or for otherwise enabling communication between two or more computers, PCs (personal computers), workstations, telephones, etc. The term "network device", "network node" or "network component" generally refers to a computer linked to a network via a network interface card (NIC), or refers to other devices or apparatus that perform specialized functions in the network, such as repeaters, bridges, switches, routers, brouters, to name a few examples. Networks may be categorized based on various features and functions. For example, the range of a network refers to the distance over which nodes are distributed, such as local-area networks (LANs) within an office or floor of a building, wide-area networks (WANs) spanning across a college campus, or a city or a state, and global-area networks (GANs) spanning across national boundaries.

In designing a network, there are a large number of possible network configurations (such as ring, tree, star, hybrid combinations of these, etc.) and communication protocols (such as analog or digital and isochronous or non-isochronous) from which to choose. For example, a star-topology network has data sources and sinks coupled to nodes and the nodes are coupled to a central hub in a star topology. Each node (which may have one or more data sources and sinks coupled thereto) assembles the data received from the one or more data sources coupled to it into the designated frame template and transmits it to the hub.

Many networks operate in accordance with the OSI (Open Systems Interconnection) Reference Model, which is a seven-layer model developed by the ISO (International Standardization Organization). The OSI Reference Model describes how to interconnect any combination of network devices in terms of seven functional layers organized in a hierarchy, and specifies the functions that must be available at each layer. From highest level of the hierarchy to lowest level of the hierarchy, the OSI Reference Model includes the Application layer, the Presentation Layer, the Session Layer, the Transport Layer, the Network Layer, the Data-Link Layer and the Physical Layer.

Network architectures (such as Ethernet, ARCnet, Token Ring, and FDDI) encompass the Data-Link and Physical Layers and represent the most common protocols used. The Data Link layer is responsible for constructing and transmitting data packets as well as receiving and deconstructing data packets, both sequences based upon the network architecture being employed. The Data-Link layer provides services for the various protocols at the Network Layer and uses the Physical Layer to transmit and receive the data packets. In a Local Area Network Carrier Sense Multiple Access with Collision Detection (LAN CSMA/CD) implementation according to the Institute of Electrical and Electronics Engineers, Inc. (IEEE) Standard 802.3 or 802.3u-1995 (IEEE Standards) (See IEEE 802.3 Standard for Carrier Sense Multiple Access with Collision Detect (CSMA/CD) Access method and Physical Layer Specifications, 1998 Edition), the Data-Link Layer is divided into two sub-layers, the Logical-Link Control (LLC) sub-layer at the top and the Media-Access Control (MAC) sub-layer at the bottom. The LLC sub-layer provides an interface for the Network Layer protocols while the MAC sub-layer provides access to a particular physical encoding and transport scheme of the Physical Layer. The MAC sub-layer is typically executed by a MAC device that operates at one of several standard clock frequencies. Similarly, the Physical Layer is typically executed by a Physical Layer Device (PHY) that is responsible for transmitting and receiving digital code from a communications media or line, and converting the digital signals into higher intelligence signals for the device MAC.

Several structures and protocols are known for implementing the Data Link (e.g., a MAC) and Physical Layers (e.g., a PHY). Ethernet using coaxial, twisted pair or fiber-optic cables operates at 10 megabits per second (Mbps) (e.g., 10BASE-T, 10BASE-F) while fast Ethernet operates at 100 Mbps (e.g., 100BASE-T, 100BASE-FX). ARCnet (Attached Resource Computer Network) is a relatively inexpensive network structure using coaxial, twisted pair or fiber-optic cables operating at 2.5 or 20 Mbps. Token Ring topologies use special IBM cable or fiber-optic cable and operate between 1 and 16 Mbps. Fast Token Ring operates at 100 Mbps. A new standard is being developed called ATM (Asynchronous Transfer Mode), which operates at speeds of 25.6 or 155 Mbps, although newer versions may operate at even higher data rates. Of course, various other network structures are known and available.

Over the years, many networks have been designed to operate in 10BASE-T protocol. However, as faster and more sophisticated communication became possible through improvements in equipment and technology, it has become desirable to provide multi-service protocols which can support both older protocols, such as 10BASE-T, as well as additional communication protocols such as those listed above. This is so that it is not necessary to replace the entire network and related components with new equipment when upgrading to the newer protocol.

During network communications, the Physical Layer (e.g., a PHY) receives data packets from the Data-Link Layer (e.g., a MAC) above it and converts the contents of these packets into a series of electrical signals that represent 0 and 1 values in a digital transmission. These signals are sent across a transmission medium to a partner Physical Layer at the receiving end of the network link. At the destination, the partner Physical Layer (e.g., a PHY) converts the electrical signals into a series of bit values, which are grouped into packets and passed up to the Data-Link Layer (e.g., a MAC) of the destination device by the Physical Layer (e.g., a PHY) of the destination partner network device.

b. Prior LAN Systems

FIG. 1 is a block diagram of a typical prior LAN system showing key functional components. It illustrates one of the most common IEEE 802.3 Ethernet communications links, which requires two PHY layer devices (e.g., a network interface card (NIC) 112 and a Switch device 114) in order to communicate. The Switch device comprises a switch 120 connected to media access controllers (MACs) 116, which are in turn connected to switch physical layer devices (Switch PHYs) 118, which are connected to a wired link 122. Similarly, the NIC 112 comprises a media access controller (MACs) 116 connected to a NIC physical layer device (NIC PHYs) 124, which is also connected to the wired link 122.

The switch device media access controllers (MACs) 116 provide data media to the switch device physical layer devices (Switch PHYs) 118, which in turn transmit and receive data from the wired link 122. Similarly, the NIC 112 media access controller (MACs) 116 providing data media to the NIC physical layer device (NIC PHYs) 124, which in turn transmits and receives data from the wired link 122. Thus, by using a communications language, mode, or protocol that the other "partner" understands, the switch and NIC are able to "talk" to each other over the "link".

The wired link 122, or media connecting two PHYs normally consists of two twisted-pair cables, with one pair utilized for receiving data and the other for transmitting data. However, various other appropriate wired link 122 media may be used to connect PHYs, such as coax cable, fiber optic cable, satellite links, cell links, radio waves, etc.

c. Physical Layer Devices (PHYs)

FIG. 2 is a block diagram of a typical prior physical layer device (PHY) 200 showing key functional components. The same basic PHY circuits can be utilized in both a network interface card (NIC), a Switch PHY circuit, as well as other network devices using various media as discussed above. Similarly, a PHY may be implemented either as a standalone single or multi-channel (e.g., 4 PHYs on a chip) device, or an integral component within a higher integrated controller that has PHY devices. The PHY function may also be implemented using a variety of an integrated circuit technology. For example, PHY functionality may be provided through a predominantly analog circuit approach or through use of a digital signal processor.

As shown in FIG. 2, a Media Independent Interface (MII) Registers and Interface Logic component 202 is connected to a transmit PHY functions component 204, and a receiver PHY functions component 206. In turn, the transmit PHY functions component 204 is connected to transmitter circuits 208. The transmitter circuits 208 are connected to a wired link 122. Likewise, the receiver PHY functions component 206 is connected to a normal and fast link pulse and valid frame detector 214, and receiver circuits 210. The receiver circuits 210 are in turn connected to the wired link 122. The transmitter circuits 208 are also connected to a normal and fast link pulse generator 212. The receiver circuits 210 are connected to a normal and fast link pulse and valid frame detector 214. An auto-negotiation state machine 216 is attached to the normal and fast link pulse generator 212, and the normal and fast link pulse and valid frame detector 214.

As part of the IEEE 802.3 standard, the MII Registers and Interface Logic component 202 provides a common interface for connecting the PHY 200 with a MAC. The MII is capable of interfacing the PHY with different types of standardized MACs so that different vendors can design standardized products that will successfully interface.

The transmit PHY functions component 204 controls the transmitter circuits 208, which transmit across the wired link 122. Likewise, the receiver PHY functions component 206 controls the receiver circuits 210, which receive data from the wired link 122.

The normal and fast link pulse generator 212 provides normal link pulses (NLPs) and fast link pulses (FLPs) used to confirm PHY connection to other "partner" or "remote" PHY's. For example, the PHY normal and fast link pulse generator 212 will generate NLPs which are then transmitted across the wired link 122 to tell a remote PHY that the transmitting PHY is still connected (i.e. an "I'm here" signal). Herein, the PHY under discussion will be referred to as simply "PHY" and a PHY at the other end of a link will be referred to as a "partner PHY" or "remote PHY". Unless stated otherwise, a partner or remote PHY behaves in the same manner as the PHY described within.

Similarly, the normal and fast link pulse and valid frame detector 214 provides normal and fast link detection for confirming a valid link with another PHY. For example, when NLPs received from the wired link 122 by the PHY receiver are detected by the normal and fast link pulse and valid frame detector 214, a valid link with the remote PHY transmitting the NLPs is confirmed. Thus, for 10-BASE-T communications, the indication to a remote PHY receiving and detecting NLP's is that all is well on the link. On the other hand, if no pulses are received by an expecting remote PHY, the link is assumed dead.

The auto-negotiation state machine 216 provides to the pulse generator 212 and recognizes from the pulse and frame detector 214, various parameters used to set up the operational mode of the communications link. For instance, the method of communication between two PHYs can be either half-duplex (receive or transmit only) or full-duplex (receive and transmit simultaneously). In addition, the auto-negotiation block sets up other parameters such as the speed of the link (e.g., 10 Mbps, 100 Mbps or 1000 Mbps), as well as the type of signaling and encoding schemes used (e.g., 100BASE-T4, 100BASE-T2). The IEEE 802.3 Standard auto-negotiation Section (IEEE Std 802.3, 1998 Ed., Section 28) provides for negotiation between two network endpoints. For example, the IEEE specifies protocol used by a linked node and hub to select a link configuration compatible to both endpoints. Thus, the auto-negotiation block is responsible for negotiating with its remote PHY partner to achieve the desired mode of operation.

The type of pulses used by a PHY to negotiate a link vary depending on the type of PHY. For example, at power on, an old standard 10BASE-T, 10 Mbps capacity PHY will transmit Normal Link Pulses (NLPs). Thus any PHY receiving NLPs is informed that it is communicating with a 10BASE-T partner, and will continue operations in 10BASE-T mode. In 10BASE-T mode, NLPs are transmitted during link negotiation as well as when the link is idle (e.g., when no data packets are being transmitted). Consequently, the NLP is known as the "link integrity pulse" or "link test pulse".

Newer 10BASE-T PHYs and 100BASE-T PHYs use Fast Link Pulses (FLPs) during link set up. FLPs allow for the passage of auto-negotiation parameters. In addition, FLPs are designed to be interpreted as NLPs by non-FLP capable PHYs. Thus, to an old 10BASE-T PHY, FLPs used during link negotiation will look like NLPs. Conversely, a newer 10BASE-T PHY will be capable of transmitting and interpreting Fast Link Pulses (FLPs), and hence will be able to detect both 10BASE-T and 100BASE-T modes of operation.

FIG. 3 is a waveform diagram of link negotiation pulses showing NLPs and FLPs. Referring to FIG. 3, pulses 302 are sent by both PHYs during link negotiation. NLPs, typically consist of a pulses 304 sent every 16±8 ms. However, FLPs typically consist of bursts of pulses 306, no more than 2 ms in duration, sent every 16±8 ms. Generally, each FLP burst of pulses 306 consists of a series of clock and data pulses. The data pulses usually carry link negotiation data indicating link speed, duplex mode, etc.

Hence, during auto negotiation, higher speed PHYs exchange information identifying what type of PHY they are and what their communications mode capabilities are. For instance, at power on, a Fast Ethernet (100BASE-T) capable PHY will startup by pulsing the media line with Fast Link Pulses (FLP) to inform remote PHYs of its existence on the line. A remote PHY will operate in a similar fashion, pulsing the media line with FLPs. When a return FLP is received by the powered on PHY, that PHY will detect the FLPs, decipher the data bits encoded therein, and identify the transmitted parameters. Generally, current systems allow the PHYs to "advertise" in this manner what mode each is capable of. The highest common operational mode is then chosen. For example, if one of the PHYs advertises 10BASE-T full duplex and the other PHY advertises 100BASE-TX full duplex, the PHY advertising 100BASE-TX will reconfigure its advertisements to the lower 10BASE-T full duplex capability.

Also, auto negotiation generally only occurs following a reset, or typically following a link failure or power up. Thus, once a link has been auto negotiated, the PHYs retain the communications mode agreed upon even though other parameters or modes may change during communications. For instance, to and from a data transmission state and an idle state.

In prior systems, a first PHY must continually transmit a signal waveform in order to maintain the link with a partner PHY at the other end for two reasons. First, the partner PHY will assume the link is severed if an identifiable waveform of signal is not received for a certain length of time, and second, the partner PHY receiver may loose its "lock" on the timing of the incoming waveform's bits and thus will not be able to decipher them. Thus, when data packets are not being transmitted over the link to a remote PHY, some other type of signal or pulse must be sent.

The type of pulses used by a PHY in between data packet transmissions varies depending on the mode of operation negotiated for that link. For example, if the link operational mode is 10BASE-T, a PHY will transmit Normal Link Pulses (NLPs) in between data packets. In this case, each PHY must continually transmit NLPs between data packets (or FLPs to be interpreted as NLPs) or the partner PHY will assume the link is severed because no identifiable signal has been received for a "timeout" period.

Alternatively, if the link operational mode is 100BASE-T, a PHY will transmit a stream of "idles" in between data packets. In the 100BASE-T case, a PHY must continually transmit the "idles" in order to keep the partner PHY from assuming the link is severed due to no identifiable waveform over a "timeout" period, as well as so that the partner PHY receiver does not loose its "lock" on the timing of the incoming bits. Unlike the slower 10BASE-T mode where there is enough time for the receiving PHY's circuitry to re-align to the timing of received data pulses, in 100BASE-T mode, it is necessary to fill the "quiet" time between data packets with a signal that enables the receiving PHY to remain in synchronization with the data pulses of a received packet. Such synchronization is necessary because at 100 Mbps (100BASE-T mode), there is usually not enough time for the receiving PHY's circuitry to re-align to the timing of newly received data pulses immediately following a significant "quiet" period.

For example, for 100BASE-T, the partner PHY receiver must lock onto a 125 Mbps bit stream (4 bits are encoded into 5 bits during transmission). Thus, the partner PHY receiver must distinguish within 8 Nano seconds per pulse bit, whether that bit is a "1" or a "0" (multiple voltage levels or voltage transitions may be used, for example, in this case MLT3 having three voltage levels corresponding to +1, 0, and −1 can be implemented with a transition to the next voltage level representing a "1" and no transition a "0"). In order to make this distinction, PHY receivers typically use a Phase Lock Loop (PLL) to tune to the transmitting PHY's output. The tuned PLL lets the PHY receiver sample the correct points in the received signal to determine if that location or bit in the waveform is a "1" or "0". Further, the receiver PLL is capable of "drifting" or adapting the time at which it takes a sample, with the drifting timing or "phase" of the received waveform characteristics. Thus the PLL is able to sample for "1" or "0" distinctions at optimum waveform locations, even when those locations drift.

The PLL recovers the phase or timing of the incoming clock to determine the timing information of the signal being received. For example, when digital pulses or bits (1's, and 0's) are being received from the media, the PLL is also receiving a timing pulse signal as well. The timing pulse signal lets the PLL know where the next bit will begin, so the PLL can sample the waveform at the proper point to distinguish whether a bit is a "0" or a "1". Thus the PLL knows when to expect the next digital signal bit. For example, the timing signal tells the PLL how many (e.g., 2, 3, or more) blank spots (0's) are in the signal between two high bits (1s).

Additionally, to assist the PLL, most receivers use an equalizer to adjust for the characteristics of the incoming line. Various types of equalizers (e.g., adaptive, fixed, etc.) can be used to balance out the effect the characteristics of the media have on the incoming signal. For example, a twisted pair cable typically experiences an attenuation which is a function of its length and the frequency of interest. The equalizer will compensate for the attenuation by creating a frequency dependant gain. This results in a frequency response that is as flat as possible, across the spectrum, for that cable length. Digital signal processor (DSP) based equalizers often use "coefficients" which are a numeric table of information to map the input characteristics of a link.

d. Power Consumption

In a common network environment, the transmitters and receivers at both ends of the associated network link use a cycle template to enable the exchange of data. The cycle template continues to be exchanged even when the template contains little or no data. This continuous transmittal of the template requires the continual expenditure of transmitter and receiver power.

Power consumption directly influences the cost of operating the device, limits design possibilities, and is of particular importance if the network component is battery driven. For example, if the network device is a lap top computer, the useful operating life of the device is a direct function of battery life.

Additionally, providing support for continuous transmittal of templates for an entire multi-service network requires significant individual network device power, as well as overall network power. Hence, the desire to reduce power consumption in LAN NICs, LAN switch equipment, and other LAN apparatus has resulted in many vendors producing low power PHY devices. However, as will be explained, there is a limit to the amount of power reduction that is possible with today's implementation of physical layer (PHY) devices.

For example, there are several industry schemes and specifications designed to manage or conserve power in a personal computer (PC) environment by powering certain PC components on and off as necessary during PC use. This scheme is generally referred to as Wake-on LAN (WOL), though different vendors may call their particular implementation something different.

For instance Microsoft Wake-on LAN™ and Advanced Micro Device's Magic Packet™ are classic examples of such schemes. Likewise, the most prevalent specifications are Microsoft OnNow™ and the ACPI (See Advanced Configuration and Power Interface Specification (ACPI), Version 1.0b, Feb. 2, 1999). There is a provision within these industry defacto standards that supports the ability to remotely wake up or put to sleep a networked PC/workstation using specific types of data packets. Thus, using such a scheme it is possible for a PC to enter a suspended mode, or be put to sleep upon receiving a packet over a network.

WOL wake-up and sleep packets are usually generated by a central management station that is responsible for managing all the PC/workstations and network devices in a network. WOL may be used simply to switch machines on or off, or automatically wake them up for software maintenance at night when the machines are not in use. These applications require a NIC to consume very little power, but be capable of waking up as soon as a packet is sent to that NIC over the network. Thus, a WOL capable PC that is connected to a LAN can be "woken up" from a power suspend mode by a wake-up packet received over the network by the PC's PHY, from a partner network device. Use of such technology allows network managers to wake up a sleeping PC update the software and then switch the PC back off.

However, a certain portion of the PC's network device must always stay on to allow the network device to be woken up from a remote location in order to wake the rest of the PC up. Thus, although a lower power states for the overall NIC may be entered in prior systems, in order to allow for Wake-on LAN capability, it is necessary for the PHY part of the NIC to stay fully powered. The fully powered PHY continually transmits and receives signals, so that a channel is kept open for receiving a "wake up" packet from a partner network device.

An example of an early WOL scheme is Magic Packet™ from AMD. Similar to a programmable VCR waking up at a certain time to record a show, Magic Packet allows a PC to be woken up from across a network without re-booting. A Magic Packet is defined as a standard Ethernet MAC frame that contains the address of the target PC NIC that is to be woken up, repeated 16 times within the packet itself. These 16 instances of the station's IEEE MAC address are preceded by 6 bytes of FF. The destination address field within the MAC frame can be either the address of the individual station to be woken up or a multicast/broadcast address i.e. an address that will be received by the PC's MAC controller device.

For example, Magic Packet gives the following example of a data sequence within a Magic Packet for a station with IEEE address '112233445566' as:

DA, SA, <misc>, FF, FF, FF, FF, FF, FF, 11, 22, 33, 44, 55, 66, 11, 22, 33, 44, 55, 66, <plus 14 times 11, 22, 33, 44, 55, 66>, <misc>, CRC.

In another example, the OnNow WOL scheme utilizes a more comprehensive packet-filtering scheme to detect certain types and protocols carried within a frame. There are three basic types of wake up mechanisms defined in the OnNow specification:
  Wake up on link status change
  Wake up on Magic Packet
  Wake up on match against a predefined byte-frame mask stored within the MAC device When in a suspend or sleep mode, the majority of the PC/workstation components are put to sleep, including the main CPU and any network software device drivers that may be interfacing to the LAN adapter. Hence, a WOL capable network device must be capable of looking at a packet and deciding if it is the correct one to wake up the PC/workstation while the rest of the machine is asleep. If the packet content is a correct match, then the adapter will produce an interrupt, which invokes the power management software. This in turn will decide if the PC/workstation is to be fully woken up, woken up just to deal with this one request with a low level device driver, or simply ignored.

In current network devices, in order to receive a wake up packet or other signal it is necessary for PHYs to stay fully powered constantly transmitting on the link between two network devices. As a result, a lower power constant idle state has been developed having Idle Symbols or Pulses that are a specific pattern of low level symbols. Thus, transmission of a continuous waveform can be accomplished in order to hold the link between two PHYs by interlacing data packets with a constant transmission of such low power idles pulses when data transmission is suspended. Nevertheless, the constant idle pulse state requires the PHY transmitter to be fully powered and the PHY is a significant contributor to the power consumption of network devices, adapters, hubs, and switches.

In prior systems, a PHY must transmit a waveform of continuous normal idles when data packets are not being transmitted in order to keep a partner PHY receiver locked into the signal that the first PHY is sending. If the partner PHY receiver fails to detect normal link idles, or data bits for a specified period, the receiver will assume that the link has been broken and the partner PHY will reset. For example, a Fast Ethernet 100BASE-TX PHY assuming the link is broken will set its Link OK flag to "false", enter the no-connect mode, and then begin auto-renegotiation by sending FLPs across the link to determine if it can adequately re-connect to the partner PHY. Thus, upon receipt of FLPs from the PHY, the partner PHY will return FLPs to link with the PHY. However, if a data packet is transmitted to either PHY prior to completion of the auto re-negotiation, the data will not be received, but instead will be "lost".

In relation to power management standards, ACPI defines three levels of power down that apply to LAN adapters:
  D0—fully operational
  D1, D2—various levels of power down (some implementations may support WOL in the D1/2 states)
  D3 hot—usually Wake-On LAN state
  D3 cold—fully powered down with all functional units non-operational Thus ACPI network devices operate in Network Device Power States D0, D1, D2, and D3.

In the D0 state, the device, including the PHY is fully powered and can freely transmit and receive data and/or idles. In the D1 and D2 or intermediate states, the device is less than fully powered, but requires the PHY to be fully powered in order to constantly transmit idle frames, even though other components of the NIC may be at less than full power. Note that some ACPI implementations support WOL in the D1 or D2 states. D3 has a "D3-hot" and a "D3-cold" state.

In D3-hot, or what prior systems call the Wake-on LAN state, the PHY is still powered up and constantly sending idle frames (symbols) because if the partner PHY fails to receive idles, it may assume that the connection has been broken (dead wire, unplugged wire, etc.) and will reset. To reset, the PHY will go to the reconnect state, and will begin transmitting in full power D0 mode (FLPs for 100BASE-T, or NLPs for 10BASE-T) to determine if the link has been physically broken, or if there was some other error. While in D3-hot, because the PHY is transmitting and receiving, the NIC may be forced back to D0 status by the partner PHY sending a re-initialization "wake up" packet.

In D3-cold the PHY may be powered down, but its receiver can not then receive a "wake up" packet. Thus, the PHY is not able to be woken up in D3-cold, and hence the PHY, NIC, PC, or workstation must be reinitialized or reset locally.

Various power requirements need to be met in the D3 states. For example, in Cardbus NIC applications, the D3-hot state requires no more than 200 mA to be drawn in total by the card in the Wake-up state, whereas the D3 cold requires no more than 5 mA. The challenge to the systems designers is that typical Fast Ethernet PHY devices today can draw more than 100-150 mA when configured in WOL mode, and therefore may exceed the 200 mA limitations. This is especially so for multi-function cards, such as LAN and Modem NICs where there are several potentially high powered devices utilized.

Much of the power consumed by a PHY goes to the transmitter, as it must be capable of driving up to 100-meters of category-5 cable and maintain IEEE compliance. Moreover, PHYs are usually over-designed to operate higher power to compensate for poor line conditions.

Consequently, as shown above, most point-to-point LAN links that exist today have no method or capacity to shut off their transmitter power between valid data transmissions or during a sleep or suspended state. For example, switching off a PHY's transmitter altogether would result in the remote partner PHY detecting a loss of link due to the lack of a transmitted signal, NLP, or scrambled idle stream being received by its receiver. As a result, the constant idle pulse state requires the PHY transmitter to be fully powered and the PHY is a significant contributor to the power consumption of network devices, adapters, hubs, and switches.

Fast Ethernet PHYs have already been designed for low voltage and/or low power operation. The overall power consumption of the PHY is reduced by reducing the operational power consumption by using lower voltages. However, there is a physical limit to the amount of power reductions that can be made to the PHY without losing IEEE compliance or compromising reliability.

In the case of standard Fast Ethernet PHY devices, when a NIC is the WOL mode, the PHY has to remain functioning at its full typical idling power even when little or no data is being transmitted or it will loose the link. Hence, a PHY capable of turning its transmitter off during quiet periods would save significant power.

In addition, there is no current method of notifying a remote network node via a simple PHY signaling scheme of the type of schemes a network node supports or requires when waking from a sleep or suspend state.

SUMMARY OF THE INVENTION

The invention provides a method and apparatus for constructing and handling link suspend pulses and the silent line state transitions of a network device operating in link suspend mode. It applies to point-to-point data communications links capable of operating in a low power link suspend mode.

Accordingly, it is an object of an embodiment of the invention to provide network devices having a full power operational mode for supporting the high-bandwidth communication requirement of the standard protocol (e.g., IEEE 802.3), and a low power "link-suspend" operational mode for operation when only limited communication is occurring, such as when there are fewer data packets being transmitted across the link. The low power "link-suspend" (LS) mode reduces the power required by a LAN communications link at the physical layer by transmitting low duty cycle "link-suspend-packets" (LSPs) instead of continuous idle pulses or symbols during non-data communication periods. For example, in LS mode, an embodiment of the invention maintains a digital communications link by sending an LSP between periods of Silent Line State (SLS) to prevent the link from resetting. During the SLS, which is a non-data transmission period, the transmitter power may be turned off to conserve power and then turned back on when there is need to transmit LSPs or data. By turning transmitter power off with a low duty cycle, i.e., between LSP transmissions, the present invention substantially reduces physical layer device (PHY) power.

Link Suspend Packets are used to maintain the communication link between the link partners. In addition, they provide enough information for the link suspended devices (e.g., PHYs in SLS) to recover the data clock in order to lock onto the incoming signal and effectively receive the data. According to an embodiment of the invention, an LSP begins with an unscrambled, predetermined and/or predictable preamble. The use of an LSP with an unscrambled and known preamble allows for easy detection of LSPs. The LSP may also include a scrambled idle sequence, followed by a termination symbol sequence. The termination symbol sequence is preferably not a symbol sequence used by the standard protocol. The scrambled idle sequence provides adequate time for the receiver loops to stabilize in preparation for entering silent line state. In one or more embodiments, LSPs are specially constructed so that they serve as part of the data preamble when the network devices are operating in the link suspend mode. Therefore, the nature of the LSPs is that they are compatible with the standard protocol requirement for data transmission.

In one embodiment, a link suspend capable PHY may be connected to an existing network of PHY devices without any change to the existing network or devices. An LS capable PHY of the present invention also operates in the standard protocol mode (e.g., IEEE 802.3) of the other network devices. Data communicated to an LS capable PHY operating in either the LS mode or the standard protocol mode may not be lost so long as the link is maintained. Thus, incorporating an LS capable PHY into an existing network of LS capable and/or non-LS capable PHYs is transparent. Operation in LS mode is negotiated between an LS capable PHY and a remote PHY that is also LS capable. One embodiment supports negotiation with a remote link partner to set up LS mode by advertising operational mode capabilities between the two network devices. Negotiation allows a PHY to easily detect whether it is connected to another LS mode capable PHY in order to initiate communication in LS mode. An LS capable PHY may transmit and/or receive in LS mode. Transmitting in LS mode is not negotiated. Thus, a PHY operating in LS mode may unilaterally disable the ability to transmit in LS mode and communication will not be lost since the partner PHY is capable of receiving in either mode.

One aspect of the invention, in accordance with an embodiment, provides a PHY capable of transmitting and receiving valid data frames when network nodes are in LS, sleep, WOL, or link suspend mode. Thus, the invention is able to return to a full communications state, from a sleep or suspend state without missing any incoming data.

BRIEF DESCRIPTION OF THE DRAWINGS

FIG. 8 is an example of a register bit map of a LS modified Media Independent Interface link suspend control and status registers showing link suspend parameters, in accordance with an embodiment of the invention.

DETAILED DESCRIPTION OF THE INVENTION

Figure 1:
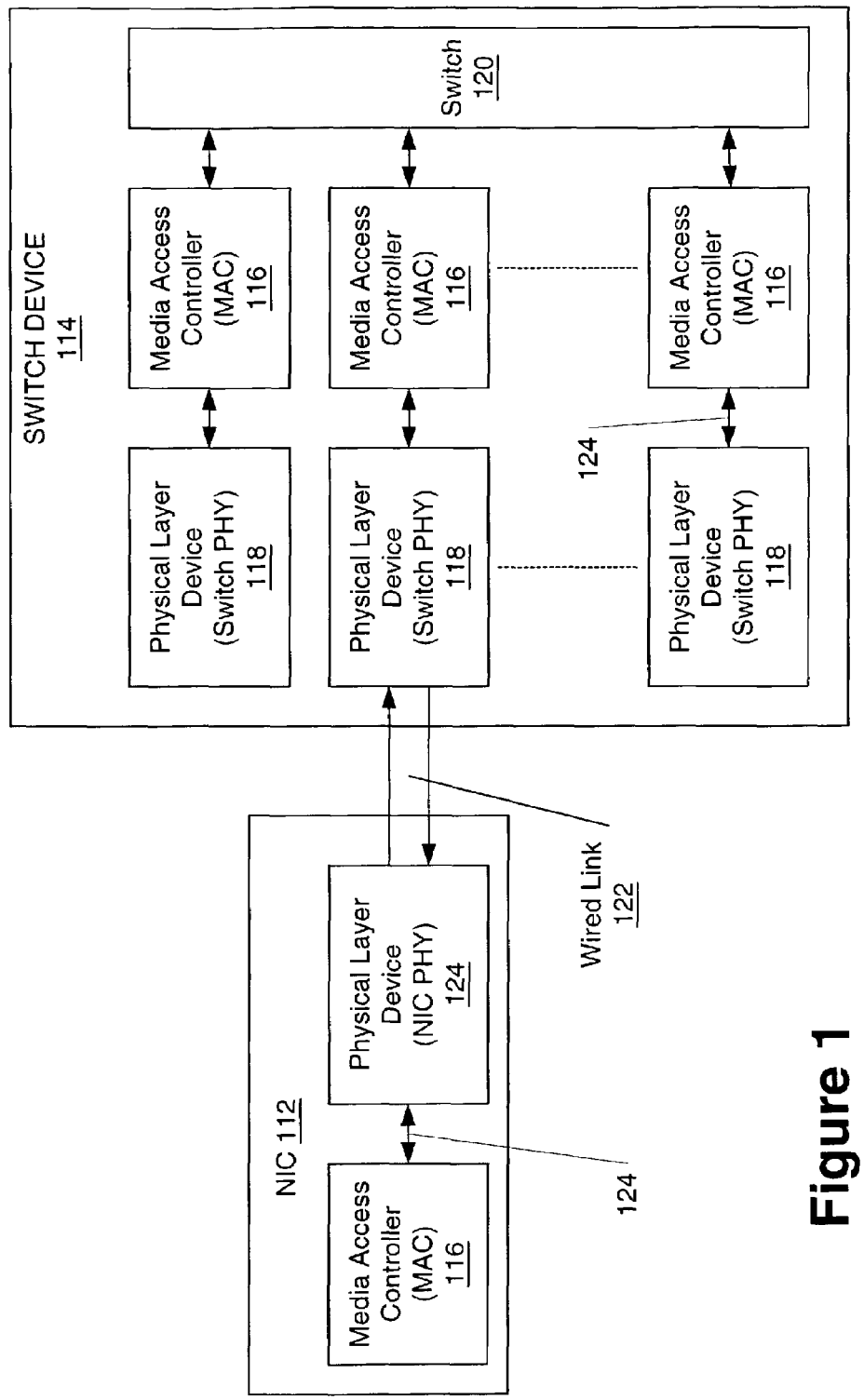
FIG. 1 is a block diagram of a typical prior LAN system showing key functional components.

The present invention is a method and apparatus for handling link-suspend pulse and silent line state transitions for link suspend operation of a network device. In the following description, numerous specific details are set forth to provide a more thorough description of the present invention. It will be apparent, however, to one skilled in the art, that the present invention may be practiced without these specific details. In other instances, well known features have not been described in detail so as not to obscure the present invention. Hereinafter, the term "system" is used to refer to a device and/or a method for performing a function. Also, hereinafter the term "network device", "network node", "physical layer device" or "PHY" is used to refer to a network apparatus, network device, network interface card (NIC), network node, network hub, a computer linked to a network via a network interface card, voice over Internet Protocol systems, LAN telephone systems, or refers to other devices that perform Internet or network communications specialized functions such as repeaters, bridges, switches, routers, brouters, or any other point to point computer communications element or portion thereof. Furthermore, the PHY function discussed could be implemented using various appropriate integrated circuit techniques such as by using a predominantly analog circuit approach or a digital signal processor (DSP) based approach.

One embodiment of the invention generally applies to computer point to point data communications links that normally use constant idle bit streams between packet transmissions. Similarly, an embodiment may also apply to the situation where LAN nodes are either idle (i.e. no packets are being transmitted) or they have entered a sleep or suspended mode of operation, such as in a wake-on LAN state. For example, the invention relates to the construction and handling of specialized data packets (called link suspend packets) used to maintain communication between network physical layer devices (PHYs) operating in a low power link suspend mode. The low power link suspend mode turns transmitter power off to save power when not needed for data communication between two linked PHYs. However, to maintain the communication link, the transmitter power is periodically turned on in order to send the link suspend packets to the link partner. The link suspend packets provide the link partner information needed to train its receiver loops in a standby mode so that it won't miss any incoming data.

Hereinafter, the terms "protocol" and the term "mode" shall be used to refer to a method, language, mode, protocol, or system of communication. In the description that follow, the standard IEEE 802.3 communication protocol for the 100BASE-TX capable PHY will be used for illustration purposes only. It will be apparent to those of skill in the art that the methods and apparatuses described herein may be applied to other communications protocols requiring continuous transmission of signals between two network devices to maintain link.

In one embodiment, the invention comprises construction and handling of link-suspend packets in a Fast Ethernet physical layer device (PHY) in the 100BASE-TX mode of operation. The invention contemplates a new generation of lower power Wake-on LAN (WOL) capable adapters and power efficient switch or hub equipments that save substantial power over prior generations. The dominant source of power required in a 100BASE-TX data link is due to the transceiver's requirement to transmit a continuous carrier. Link Suspend (LS) is a method by which a link is maintained while allowing the transmitter to be powered down during idle periods. The Link Suspend state eliminates the need for constant transmission of scrambled IDLE or similar symbols (i.e., depending on the requirements of the communications protocol) during IDLE periods and replaces it with a low duty cycle signal (i.e., LSPs) which serves the purpose of maintaining the link. LSPs are specially constructed to provide information necessary to train the receiver loops of a partner PHY in order to prevent loss of incoming data during low power operation.

The Link Suspend concept is expandable to other similar Local Area Network standards, such as 10BASE-T, 100BASE-T2, 100BASE-T4, 1000BASE-T or X and 802.5 networks (including High Speed Token Ring) where two communicating nodes share a common link.

Moreover, the invention may apply to various other appropriate data communications links, communications systems between two devices, point-to-point data communications links, and signal transmission and reception systems. For example, the invention can be applied to wireless networks, satellite networks, RF (Radio Frequency) networks, or any other system where idle transmission periods are filled with non-data carrying transmissions for the purpose of maintaining a valid link. Similarly, Link suspend can also be used with various other appropriate media such as coaxial cable, fiber optic cable, satellite links, cell links, radio waves, etc.

According to an embodiment, to ensure compatibility with prior PHY devices, link suspend may be implemented as enhancements to existing functional blocks within a PHY that normally uses constant idle bit streams between packet transmissions. Yet, the invention may be used with various other appropriate Physical Layers, PHYs, and network devices comprising various other appropriate communications networks.

a. Power Savings

In LAN equipment that exist today most high speed point-to-point LAN links have no method of shutting off the transmitter power between valid data transmissions or during a sleep/suspended state without causing the link to reset. Hence, a low power LS mode of operation is described that facilitates reduction of overall PHY power consumption at both ends of the link when network traffic intensity is reduced.

According to an embodiment, two connected communications nodes may enter a low power link suspend mode of operation when both nodes are link suspend capable. The nodes are able to temporarily suspend operation during idle transmission periods on the link and can recover to full operation without losing network data. This "link suspend" (LS) state may be in response to a specific request by a host controller wishing to enter a lower power mode of operation and suspend network communications until a specific network packet or event causes the node and host to wake up. In Link Suspend state, two link partners that are both able to implement the scheme may send low duty cycle Link Suspend Packets (LSPs) back and forth in a complimentary fashion in order to keep the link operational between normal data packet transmissions. Note that a PHY which is capable of Link Suspend may also be capable of operation in the standard communications protocol (e.g., IEEE 802.3 defined 100BASE-TX). Depending on configuration, such a PHY may be capable of receiving both Link Suspend and the standard communications protocol traffic.

According to one embodiment, one, or both, of the linked PHY partners in link suspend state, may cease continuous transmission of scrambled Idle symbols, as required to maintain link, in accordance with the default communication protocol (e.g., IEEE 802.3) and instead transmit low duty cycle Link Suspend Packets (LSPs) between periods of Silent Line State (SLS). SLS is a period when the communication link between the linked PHY partners is basically silent because there are no signals present on the media dependent interface (MDI). Therefore, in SLS the linked PHY partners may shut off their transmitters and receiver loops to conserve power. LSPs serve multiple purposes in the LS mode. For example, LSPs protect the network from the consequences of simplex link segment failures. For instance, by sending a known pattern of LSP, the link partners have a periodic confirmation that the link is still operational. Secondly, LSPs provide signals for periodic resynchronization of the clock recovery and equalizer circuits. Also, LSPs preserve the link status during idle periods between adjacent LSPs.

Thus, a benefit of the Link Suspend state is to lower consumption of power by PHY devices during a period that would normally be composed of the scrambled Idle state of the standard protocol. The transmitter need only be on when needed to send LSPs during the periods when no data is being communicated between the PHY partners. Thus, since the ratio of the time when the transmitter is on versus off while in the Link Suspend mode may result in significant reduction in the power consumption for a physical layer device, the system allows both physical layer devices at each end of the link to save power.

Similarly, LS may also be employed where general power reductions are required during quiet times on the LAN. As more networks migrate to 100 Mbps at the desktop, the savings become more apparent. For instance, if the average power savings are of the order of 90 mA per network device (180 mA per link), then for 3.3V systems, this translates to approx. 300 mW per PHY. For a 1000 PC network, this translates to 300 W for the PC NIC PHYs and 300 W for the corresponding switch PHY port, i.e., 0.6 kW total.

One embodiment vastly reduces power on a systems wide basis and improves implementation of a PC's Advanced Configuration Power management Interface (ACPI) implementation for LAN capable PCs, along with the Microsoft OnNow™ Wake-on LAN™ (WOL) network interface cards within the newer generation of networked personal computers. In addition, the lower power consumption on every link in the network reduces network operational costs and system cooling requirements.

b. Negotiation of LS Mode

A plurality of PHY devices on a network may be capable of communicating using the same standard communication protocol, e.g., IEEE 802.3. Thus, whether or not the PHY devices are LS capable, they are able to communicate using the standard IEEE 802.3 protocol when linked. As discussed earlier, PHY devices that are LS capable are also capable of communicating in their standard communications protocol. Therefore, a LS capable PHY device connected to a network of non-LS capable PHY devices is able to communicate with the non-LS capable PHY devices using the standard protocol. Thus, in one embodiment, the standard communication protocol may be a fallback mode of operation while communication in LS mode is a negotiated solution between link partners. This makes addition of LS capable devices onto a network transparent since if one of the devices cannot communicate in LS, they simply failback to the standard protocol mode. Accordingly, LS capable network devices may recognize other LS network devices through the use of negotiation procedures during link initialization (e.g., at power-up or from a no-connect state). Hence, a low power LS mode of operation may provide for negotiation or auto-negotiation to advertise available low power mode capabilities allowing a LAN adapter or switch product to add several unique features. In the case of an ACPI/WOL capable NIC, one advantage is much lower power consumption when the WOL scheme is in use. Thus, it is possible to offer an energy efficient or "green" switch that is capable of recognizing link-suspend capable adapters and entering a corresponding per port low power mode of operation, significantly reducing the idle power consumption of the switch.

According to an embodiment, implementing LS in either an ACPI/Wake-On LAN capable adapter or energy efficient switch is straightforward. The ability of a PHY to operate in Link Suspend mode may be advertised to a remote link partner with a Link Suspend Available (LSAV) bit. A NIC may have the LSAV bit enabled as a default, relying on the PHY to automatically enter the mode based on the auto-negotiation result. During auto-negotiation, the LSAV bit may be received from the link partner PHY indicating that the partner is capable of link suspend operation. Hereinafter, the LSAV bit received from the partner PHY is designated LPLSAV (Link Partner LSAV). The PHY may only be allowed to enter Link Suspend State when both itself and the remote PHY have indicated that they support Link Suspend, i.e., both LSAV and LPLSAV are asserted. Additionally, other embodiments may provide for the mode to be entered only when the adapter wishes to enter link-suspend, e.g., when the PC is shutting down and entering a sleep state. Hardware selection of link-suspend operation may be useful for dumb switch controllers that do not have a programmable engine or CPU attached to enable (or configure) link-suspend via software.

Additionally, any two network devices may be able to operate in the link suspend mode if they are capable of transmitting and/or receiving link suspend packets (i.e., LSP). Note that link suspend packets and link suspend pulses are used interchangeably in this specification. A link suspend packet comprises the data sent as a link suspend pulse.

In local area networking equipment that exist today there is no means by which a switch or hub PHY may easily detect whether it is connected to a suspended Wake-on LAN adapter in a PC, thus allowing it to enter a lower power mode of operation for that port. Thus an additional benefit, according to an embodiment, solves the prior difficulty by providing a simple PHY signaling scheme of notifying a remote network node of the type of schemes a network node supports or requires when waking from a sleep or suspend state, such that the remote node may behave accordingly.

Likewise, a third benefit, according to an embodiment, is that link suspend is defined to be a mode of operation which was agreed to during negotiation and is thus not lost so long as both link partners are connected. Thus, exiting from and re-entering into the LS state may not require the two link partners re-negotiate the link. For example, an LS operating network device which has LS_RX_EN de-asserted may unilaterally enable or disable LS mode transmit (LS_TX_EN=True, or False), so long as the partner PHY is LS mode receive enabled (LPLS_RX_EN=True), thus technically operating in the standard protocol mode when LS_TX_EN=False and in LS mode when LS_TX_EN=True.

Also, an LS operating PHY may exit the LS state and re-enter the standard link state (e.g. IEEE 802.3 normal mode with continuous idle transmission) without resetting to a no-connect state or re-negotiating the link.

Figure 4:
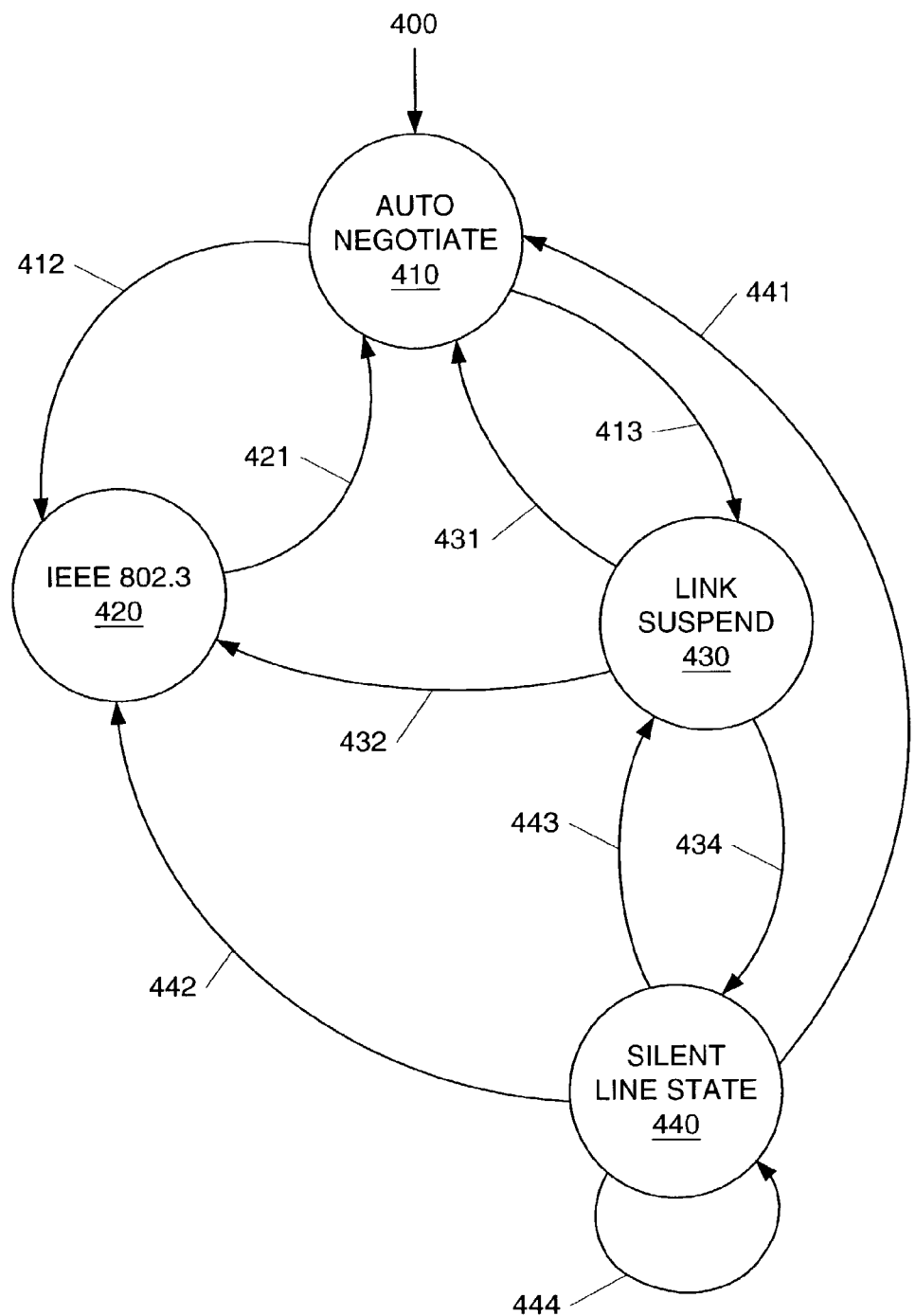
FIG. 4 is an illustration of a typical top-level state transition diagram of a PHY device in accordance with an embodiment of the present invention.

According to an embodiment, a PHY device capable of Link Suspend operation may operate in various states including an auto-negotiation state, a Link Suspend (LS) state, a Silent Line State (SLS), and a default communications protocol state (e.g., IEEE 802.3). FIG. 4 is an illustration of a typical top-level state transition diagram of a PHY device in accordance with an embodiment of the present invention. For this illustration, the states of a PHY device comprise auto-negotiation 410, Link Suspend (LS) state 430, Silent Line State (SLS) 440, and IEEE 802.3 communication state 420. When two PHY devices are connected, they enter the Auto-Negotiation state 410 through path 400 which could be from a no-connect state, for example. In Auto-Negotiation state 410, the connected PHYs broadcast their LS capabilities to each other so that they can properly configure and enter the correct states of operation. Communication during the auto-negotiation state 410 may be by the Next-Page auto-negotiation function of the IEEE 802.3 specification, for example. From auto-negotiation state 410, a PHY device may transition to Link Suspend state 430 or IEEE 802.3 state 420. In this illustration, IEEE 802.3 is the default mode of operation. The ability of a PHY device of the present invention to operate in both the LS state 430 and IEEE 802.3 state 420 makes transparent insertion of the PHY device into existing networks possible.

An embodiment of this invention includes the added ability within the auto-negotiation process 410 to exchange capabilities and parameters associated with link-suspend. Thus, when two link-suspend capable PHYs are first connected or powered on, in addition to the other typical negotiation parameters, the PHY's may exchange parameters with each other to determine if they can support link-suspend. For example, unused bits in the baseline auto-negotiation or Next Page extensions, as described in the IEEE 802.3 standard, may be used to auto-negotiate link suspend mode as well.

A link suspend capable PHY may control its ability to advertise support for link-suspend via a control bit such as the Link Suspend Available (LSAV) bit, which may be controlled by a higher level device via the MAC. A link partner's ability to support link-suspend mode, determined during the auto-negotiation process, may be indicated by the Link Partner Link Suspend Available (LPLSAV) bit. A PHY may only enable Link Suspend if both of these flags are active. Auto-negotiation of Link Suspend mode will be discussed further below.

Transition of the PHY device from auto-negotiation state 410 to IEEE 802.3 state 420 follows path 412 which may be satisfied if either or both PHY device(s) is (are) incapable of operating in the Link Suspend mode of the present invention. That is, when either or both LSAV and LPLSAV are not asserted only the default mode of operation is available and the PHY transitions through path 412 to the IEEE 802.3 state 420. Of course, PHY devices operating in the IEEE 802.3 state 420 may transition back to auto-negotiation state 410 via path 421 to re-negotiate the link if, for example, the link is lost between the communicating PHY devices. Note that there may not be any transitions from the IEEE 802.3 state 420 to either Link Suspend state 430 or Silent Line State 440 if link Suspend Mode was not the negotiated solution. Thus, to enter LS mode (LS 430 or SLS 440) from IEEE 802.3 state 420, the PHY returns back to auto-negotiation state 410 to re-negotiate the link with the partner PHY.

A PHY device may transition from auto-negotiation state 410 to LS state 430 via transition path 413 when both PHY devices are capable of link suspend mode of operation in accordance with an embodiment of the present invention. This may be accomplished if both LSAV and LPLSAV bits are asserted during auto-negotiation, for instance. In LS state 430, the PHY may send periodic, low duty cycle Link Suspend Packets (LSPs) which maintains the link and serves other purposes such as providing the link partner a periodic confirmation that the link is still operational, and providing the receiver PHY a signal for periodic resynchronization of its clock recovery and equalizer circuits.

A PHY device may transition from LS state 430 to auto-negotiation state 410, IEEE 802.3 state 420 or SLS 440. PHY devices operating in LS state 430 may transition back to auto-negotiation state 410 via path 431 if, for example, link is lost between the communicating PHY devices. Communication may be lost due to power interruption, communication timeout (e.g., due to absence of link suspend packets), etc. Communication timeout may occur if, for instance, no LSPs or frame activity are detected for a period of time which may be an indication that a cable has been unplugged or remote link partner has been switched off. The timeout limit may be set in the PHY so that each PHY keeps tab of the state of the link. Additionally, transition from any state back to auto-negotiation state 410 may be due to requirements specified in the appropriate standard (e.g., IEEE 802.3).

A PHY device operating in link suspend mode (e.g., from LS state 430, or SLS 440) may unilaterally decide to revert to operation in the IEEE 802.3 state 420 from LS state 430 via transition path 432 (or path 442 if operating from SLS 440). A PHY device may transition from LS state 430 to SLS state 440 via path 434 upon receiving a transmission termination data sequence. A termination data sequence may consist of any appropriate and unique sequence of data not in conflict with the requirements of the standard protocol (e.g., the symbols /L/L/). For IEEE 802.3 protocol PHY devices, the /L/L/ symbol sequence is invalid thus is ideal for the termination sequence. It will be apparent to those of skill in the art that the termination data sequence could be any group of symbols so long as it does not conflict with symbols recognized for other purposes by the standard protocol.

Figure 5:
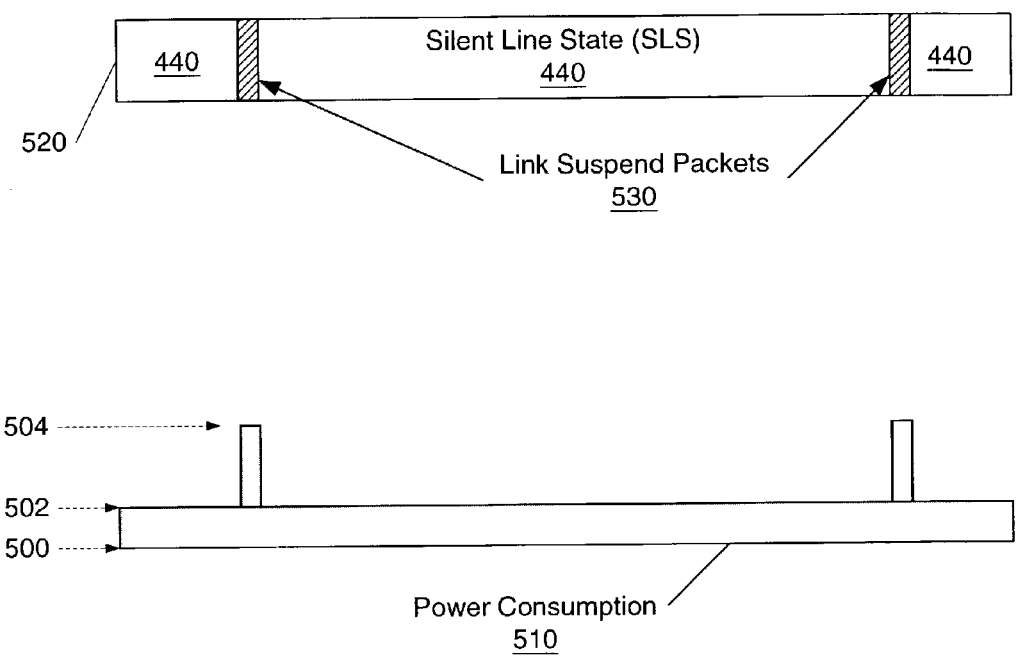
FIG. 5 is an illustration of the power consumption of a Link Suspend PHY operating during the period between data transmissions.

While in SLS 440, the PHY device may operate in the low power consumption mode of the present invention and may monitor the incoming line for signals that may trigger transition back to LS state 430. For example, the PHY device may monitor for a specific incoming data sequence such as "P" which could be a data sequence with a 11011 (i.e., any data pattern with high transition density) pattern to trigger the receiver out of a sleep state, or a timing trigger which indicates it is time to transmit a Link Suspend Packet to the link partner thus waking up the transmitter. Transition to LS state 430 from SLS 440 occurs via path 443 when a PHY device is ready to transmit a link suspend packet. After transmission, the PHY device may return back to SLS 440 via path 434 to conserve power. Thus, an LSP occurs between adjacent periods of SLS and serves to maintain link and train the receiver loops of the receiving PHY. During SLS 440, the PHY device is using minimal power because the transmitter and receiver circuits may have been turned off. FIG. 5 is an illustration of the power consumption of a Link Suspend PHY operating during the period between data transmissions (i.e., during idle state).

Referring to FIG. 5, block 520 represents the state of the PHY in link suspend mode and block 510 represents a sample power consumption curve. Of course, the power consumption (i.e. 510) of an LS mode PHY at any given time is a function of the state of the PHY and which components are switched off when not in use. For instance, when in the SLS 440, the power consumption is at a reduced level 502 due to the transmitter being powered down. For illustrative purposes, power level 500 represents a reference no-power consumption state (e.g., PHY is powered off).

When a link suspend packet 530 is transmitted from LS state 430, the PHY power consumption level jumps from level 502 to level 504. Level 504 is equivalent to that of a non-link suspend capable device transmitting standard idles. Power level 502 is the power consumption during Silent Line State 440. It shows minimal power consumption because very limited number of components of the PHY need be powered during SLS. Devices that may benefit from reduced power consumption include but are not limited to: wake-on LAN, green switches, and portable computers. Power savings due to suspension of the transmitter functions alone are estimated to be up to 50% of the entire device power for low bandwidth transmissions.

Note that the invention also contemplates powering down various other appropriate circuits in addition to or instead of some or all of the transmitter circuitry during SLS 440. For instance, upon entering SLS 440 the transmitter as well as the normal and fast link pulse generator 212 and/or transmit PHY functions 204 can be shut down, thus saving power without causing a renegotiation of the link. Therefore, a PHY device operating in SLS 440, in accordance with an embodiment of the present invention, may consume significantly less power than a PHY device operating in the standard IEEE 802.3 state 420.

Referring back to FIG. 4, operation in SLS 440 may be maintained using counters (e.g., digital counters) and so long as the counters do not time out, SLS 440 is maintained via path 444. The counters may time out if, for example, the transmitting PHY fails to send a link suspend packet during the allotted timing period. As previously discussed, link suspend packets are used to maintain link and train the receiver loops (i.e., keep them in phase). Thus, if link is lost when in SLS 440, for example due to a timeout condition, the PHY may transition back to auto-negotiation state 410 via path 441 or to IEEE 802.3 state 420 via path 442, depending on the desired implementation.

According to embodiments of the present invention, a Link Suspend capable PHY may be able to transmit and/or receive in Link suspend mode. The ability to receive link suspend formatted traffic may be negotiated during auto-negotiation 410. For instance, the auto-negotiation receive function may be used to identify the link partner as being able to meet the link suspend receive specification if a Link Suspend Receive Enable (LS_RX_EN) bit is set in the Auto-Negotiation Unformatted Next Page of IEEE 802.3 specification. For consistency, the LS_RX_EN bit received from the link partner is designated as the Link Partner LS_RX_EN (LPLS_RX_EN) bit.

When a local PHY detects a remote link partner's LS_RX_EN bit is de-asserted (i.e., LPLS_RX_EN=0), it should not transmit LS formatted traffic to the link partner. A remote link partner, by de-asserting its LS_RX_EN bit is advertising that it may not be capable of receiving the LS transmitted format data. Thus, the link partner may receive data only in the standard protocol (e.g., IEEE 802.3) format. Note that an LS capable PHY may receive data in either the LS format or the standard protocol format but may only receive LS formatted data if the LS_RX_EN bit is asserted.

Therefore, a PHY that sets its LS_RX_EN bit indicates to a remote link partner that it is capable of receiving Link Suspend formatted traffic. The table below shows the allowed states of a PHY after Auto-Negotiation is complete and Link Suspend has been enabled (i.e., LSAV=1 and LPLSAV=1).

| LS_RX_EN | LPLS_RX_EN | Allowed States |
|---|---|---|
| 0 | 0 | Standard format (e.g., IEEE 802.3) transmit and receive. |
| 0 | 1 | Receive standard format; and Transmit Link Suspend or standard format. |
| 1 | 0 | Receive Link Suspend or standard format; and Transmit standard format. |
| 1 | 1 | Receive Link Suspend or standard format; and Transmit Link Suspend or standard format. |

As shown in the table, if both PHYs advertise the ability to receive link suspend traffic (i.e., LS_RX_EN=1 and LPLS_RX_EN=1), link suspend traffic may be passed bi-directionally between the PHYs. Since each LS capable PHY is also capable of receiving in the standard protocol format, the local PHY is also capable of receiving and transmitting data in the standard format when operating in LS mode. Thus, if the remote PHY (i.e., link partner) unilaterally decides to stop transmitting in LS mode, the local PHY can still receive the traffic and no data is lost. In the event that the local PHY advertises the ability to receive link suspend traffic (i.e., LS_RX_EN=1) but the remote PHY does not (i.e., LPLS_RX_EN=0), only standard protocol formatted data will be transmitted to the remote PHY from the local PHY. However, the local PHY may receive data formatted either in link suspend mode or the standard protocol format from the remote PHY.

Where the local PHY advertises inability to receive link suspend traffic (i.e., LS_RX_EN=0) but the remote PHY advertises the ability to receive in LS mode (i.e., LPLS_RX_EN=1), then LS mode formatted traffic or standard protocol formatted traffic will be sent to the remote PHY from the local PHY. However, the local PHY may only receive data in the standard protocol format from the remote PHY since it is incapable of receiving LS formatted data.

Finally, if neither PHY advertises the ability to receive Link Suspend traffic (i.e., LS_RX_EN=0 and LPLS_RX_EN=0), operation reverts to the prescribed standard (e.g., IEEE 802.3) for transmit and receive traffic.

In one or more embodiments, the ability of a PHY to transmit in LS mode is controlled by station management (e.g., MAC) through a Link Suspend Transmit Enable (LS_TX_EN) bit. The LS_TX_EN bit may be non-negotiated so that a PHY configured for Link Suspend may unilaterally decide, at any time, to disable transmission in LS mode and switch to the standard protocol (e.g., IEEE 802.3) format, without losing link and having to re-negotiate. The remote PHY continues to receive traffic without losing data since it is capable of receiving data in either format at all times. However, local PHY changes to LSAV and LS_RX_EN only take effect during Auto-Negotiation since they are negotiated bits.

In accordance with an embodiment, station management could unilaterally disable transmission of LSPs when a particular traffic pattern is detected which necessitates the change from LSPs to standard idles. Thus, when the ability to transmit LSPs is disabled, the transmitter sends carrier (e.g., standard idles and data) as per the prescribed standard (e.g., IEEE 802.3) and the link partner receives this traffic as per the standard.

Additionally, the invention contemplates unilateral re-enablement of Link suspend transmission so long as LPLS_RX_EN was previously negotiated during auto-negotiation, without requiring a renegotiation of the link. Thus, for example, station management could also unilaterally disable transmission of standard idles and data when a particular traffic pattern is detected which necessitates the change from standard idles to LSPs. Then, when the ability to transmit standard idles and data as per the prescribed standard (e.g., IEEE 802.3) is changed to the link suspend mode, the link partner is able to receive the LS mode traffic.

Embodiments of the invention include various systems for negotiating link suspend mode. In one embodiment full auto-negotiation based on a Next Page scheme of IEEE 802.3 is used. In other embodiments, transparent negotiation using a low level signaling scheme may be employed. Additional embodiments comprise combinations of schemes, such as, for example, combining a version of full Next Page auto-negotiation with a transparent negotiation backup.

According to an embodiment of the present invention, link suspend capability may be negotiated through use of full auto-negotiation based on Next Page capability. Next Page auto-negotiation may be enabled when a link suspend auto-negotiate (LSAN) control bit is set. For instance, following a reset, if LSAN is set, then the PHY will support the Next Page link suspend auto-negotiation scheme. Note that LSAN may also default to false (zero) following a power on reset, but should not be affected by a soft reset to support any mode of operation. In addition, embodiments may incorporate hardware control pins to allow the default value of LSAN to be set to facilitate applications that do not wish to use software to change the LSAN setting (e.g., multi-port PHYs in switch applications).

For example, in an embodiment, unused bits in the baseline auto-negotiation or Next Page extensions, as described in the IEEE 802.3 standard, may be used to auto-negotiate link suspend mode. For instance, after a Fast Ethernet PHY transmits an FLP, if there is a return pulse, the PHY will then pass information identifying what type of PHY it is and what modes it is capable of supporting. Next page auto detection of link suspend will be explained further below.

c. Transparent Negotiation of Link Suspend Mode

Additionally, according to an embodiment of the present invention, link suspend capability may be negotiated through transparent auto-detect via low level signaling. Transparent auto-detect is simple to implement and offers a basic indication to a remote PHY that a first PHY is capable of link-suspend. Low level signaling (compatible with the existing Ethernet standards) from the first PHY takes place following a PHY reset or power on. This scheme provides a simple method for advertising link suspend ability without the need for modification to the current auto-negotiation standards as discussed above for full auto-negotiation of link suspend mode.

For an embodiment having an auto-negotiation system using both a Next Page scheme and a transparent scheme, transparent mode may still be active during Next Page auto-negotiation mode, however, any common parameters setup as a result of the transparent negotiation may be over-ridden by those exchanged during the Next Page auto-negotiation mode. In one such example, transparent auto-detection of link suspend is enabled when the link suspend auto-negotiate (LSAN) control bit is false (default) and auto-negotiation Next Page is also disabled (see below). In this mode, a LS capable PHY will employ a simple transparent signaling method embedded within the standard FLP or 100BASE-T templates to signal link-suspend ability to a remote partner. This process will only occur if the link-suspend available (LSAV) control bit in the LS capable PHY is set. Upon recognizing the embedded LSAV signal from a partner PHY, the LS capable PHY will set its own link partner link-suspend available bit (LPLSAV) in order to allow for entry into LS mode.

Link-suspend operation is then enabled once the link-suspend receive enable bit (LS_RX_EN) is set, indicating that the higher layer device wishes to enter the link-suspend mode. Setting LS_RX_EN inactive causes the device to leave link-suspend mode and re-enter IEEE 802.3 standard operating mode as illustrated in FIG. 4 and discussed in more detail above.

The benefit of a low level detect mode is that it can work within the framework of the existing IEEE 802.3 auto-negotiation standards without the need for changes to the standard. For example, the low level detect method for certain existing series of Fast Ethernet PHY devices and cores will inter-operate fully with existing legacy PHYs in the market place today. Thus, systems using current auto-negotiation standards may comprise LS capable devices that will recognize another LS PHY device as the remote PHY and enable the link-suspend capability. Furthermore, in an embodiment, the LSAV and LPLSAV flags are used internally by the PHY and are also made available to the MAC or Switch.

Although auto-negotiation according to one embodiment may be used to negotiate Link Suspend mode, other appropriate methods and/or devices for allowing network devices to communicate in link suspend mode may also be used. For example, a hardware configuration that causes connected PHYs that are LS mode capable to automatically try link suspend mode after the no connect state, by sending a link suspend packet and listening for a return link suspend packet in order to identify partner LS capability may be used. Similarly, although according to the embodiments discussed above, negotiation of LS capability is done during initial link negotiation or after no-connect state. Negotiation, identification, or entry of LS mode may also be performed at various other appropriate times. In addition, an embodiment of the invention provides for backwards compatibility, so that the LS PHY can interface with non LS PHYs.

d. Link Suspend Mode

According to an embodiment, after negotiation of LS mode capability, an LS PHY or device has multiple options or modes of operation. For instance, the LS capable PHY may enter a Normal mode (e.g. mode of prior devices), or an LS mode of operation. For example, a 100 Mb Fast Ethernet mode (100BASE-T) PC NIC, may enter Normal IEEE 802.3 mode having its PHY fully powered, and continually transmitting and receiving normal Idles and data. Alternatively, the PC NIC may enter a low power LS mode.

Thus, as shown in FIG. 4, once the auto-negotiation process 410 is complete, the PHY may enter a normal operating mode IEEE 802.3 state 420 or Link Suspend state 430. While in standard operating mode 420, the PHY receives standard idles and/or transmits standard idles as per the IEEE 802.3 standard. In full duplex mode, both receive and transmit of standard Idles can occur simultaneously.

Figure 6:
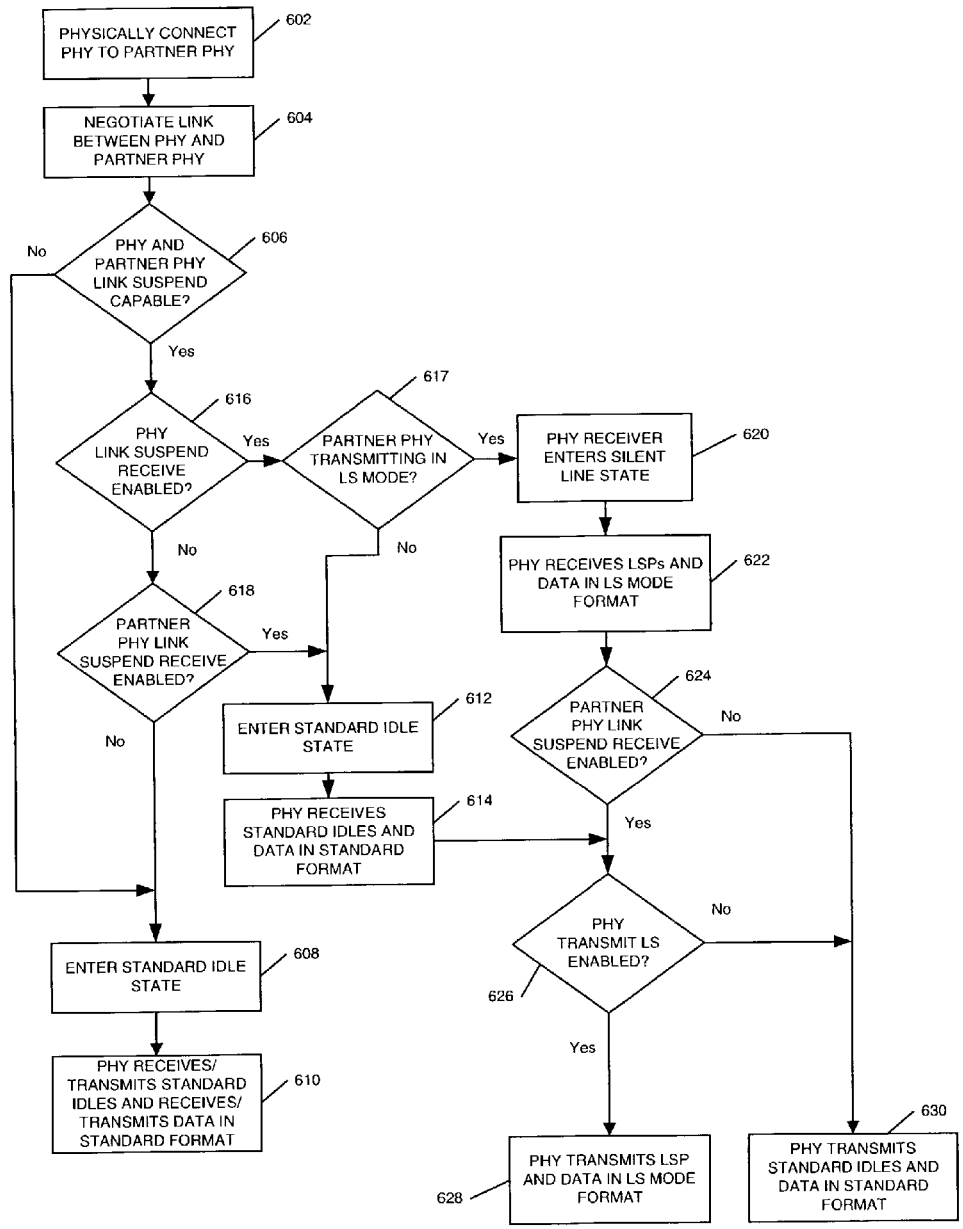
FIG. 6 is a flow diagram illustrating determination of transmit and receive states of a PHY connected to a partner PHY, in accordance with an embodiment of the invention.

FIG. 6 is a flow diagram illustrating determination of transmit and receive states of a PHY connected to a partner PHY, in accordance with an embodiment of the invention. As shown in FIG. 6, a PHY and partner PHY physically connected in block 602, can negotiate a link between them (e.g., at block 604). The physical connection at block 602 may be due to a line disconnect, power cycle, protocol requirement for re-negotiation of link, etc. The negotiation may occur during an auto-negotiation phase, for example. For instance, the PHYs may use the Next-Page Auto-Negotiation function of the IEEE 802.3 specification in order to pass parameters between the PHYs. Thus, at block 604, the PHY and the partner PHY determine each other's configuration with respect to ability to receive Link Suspend signals.

Using the configuration parameters obtained during link negotiation in block 604, the PHY determines it's allowed transmit and receive configurations as illustrated in the remaining logic blocks. For instance, a determination is made at block 606 whether the PHY and the partner PHY are link suspend capable (i.e., LSAV and LPLSAV are both set to true). If either PHY is not link suspend capable (i.e., LSAV=0 or LPLSAV=0), then the non LS capable PHY can neither receive nor transmit communications that include LSPs thus may not operate in the link suspend mode. Therefore, both PHYs may revert to the standard protocol method of communication. For instance, if the IEEE 802.3 standard is employed, both PHYs enter the standard idle state at block 608, so that the PHY can receive and transmit standard IEEE 802.3 idles and receive data in standard IEEE 802.3 format at block 610.

However, if at block 606 it is determined that both PHYs are link suspend capable (i.e., LSAV=1 and LPLSAV=1), then further determination need be made whether each will transmit and/or receive in link suspend (LS) format or in standard (e.g., IEEE 802.3) format. First it is determined whether the PHY is LS receive enabled (i.e., LS_RX_EN=1) at 616. If the PHY is not LS receive enabled (i.e., LS_RX_EN=0), then it will not receive communications that include LSPs. At block 618, a determination must be made whether the partner PHY is LS receive enabled (i.e., LPLS_RX_EN=1) in order to properly configure the PHY transmitter functions. If it is determined (at block 618) that both the PHY and partner PHY are not LS receive enabled (i.e., LS_RX_EN=0 and LPLS_RX_EN=0) then they may both enter standard (e.g., IEEE 802.3) idle state at block 608 and communicate in standard protocol (e.g., IEEE 802.3) format at block 610, as neither is able to receive communications that include LSPs. Note that although both PHYs are LS capable, they are both able to communicate in standard (e.g., IEEE 802.36) format. Also note that, in other embodiments, it may be possible for either and/or both PHYs to change to LS receive enabled after the link has been established, thus allowing either and/or both to operate in LS mode. However, since in some embodiments LS receive enable is negotiated during auto-negotiation, LS mode may not be available until the link is re-negotiated.

If the result of the determination at blocks 616 and 618 is that the PHY is not LS receive enabled but the partner PHY is LS receive enabled then the PHY's receiver enters standard idle state at block 612 so that it can receive standard (e.g., IEEE 802.3) idles and data in standard (e.g., IEEE 802.3) format at 614. It is then determined, at block 626, whether the PHY is enabled to transmit link suspend packets (i.e., LS_TX_EN=1) because a PHY in LS mode may unilaterally and at any time decide to disable the ability to transmit LSPs. Note that a determination to transmit or not transmit in LS mode (i.e., block 626) may be done at any time by the PHY after the link is established for an LS mode receive enabled partner PHY. Therefore, if the PHY is LS transmit enabled, it may transmit LSPs and data in LS mode format at block 628 since the partner PHY is capable of receiving in that format. In this mode of transmission, the PHY may shut down its transmitter and other circuitry when not transmitting LSPs or data to save power. However, if the PHY is not LS transmit enabled, it transmits standard idles and data in standard format (e.g., block 630) since the partner PHY is capable of receiving standard protocol format data and idles. In this mode, the transmitter may not be shut down, but other hardware functions, not being utilized, may be shut down to save power.

If the PHY is LS receive enabled, as determined in block 616, then it can either receive or transmit communications that include LSPs. A determination is made at block 617 whether the partner PHY is transmitting in LS mode. If no, the PHY receiver enters standard idle state at block 612. Otherwise, the PHY receiver enters Silent Line State at block 620 and is available for receiving LSPs and data in LS mode format at block 622. In this receiver mode of operation, a determination is made at block 624 whether the partner PHY is LS receive enabled before a decision can be made on the mode of transmission of the data to the partner PHY. If the partner PHY is not LS receive enabled, the PHY transmits standard idles and data in standard format at block 630.

If the PHY is LS receive enabled (determined in block 616), and the partner PHY is LS receive enabled (determined in block 624), then the PHY and the PHY partner can receive and transmit communications that include LSPs. It is then determined, at block 626, whether the PHY is enabled to transmit link suspend packets because a PHY in LS mode may unilaterally decide to disable the ability to transmit LSPs. If the PHY is LS transmit enabled, it may transmit LSPs and data in LS mode format at block 628 since the partner PHY is capable of receiving in that format. In this mode of transmission, the PHY may shut down its transmitter and other circuitry when not transmitting LSPs or data to save power. However, if the PHY is not LS transmit enabled, it transmits standard idles and data in standard format (e.g., at block 630) since the partner PHY is capable of receiving standard format data and idles. In this mode, the transmitter may not be shut down, but other hardware functions, not being utilized, may be shut down to save power.

LS mode may be enabled when LSAV and LPLSAV are active as discussed earlier. The LS_RX_EN and LS_TX_EN discretes may be implemented as control register bits that are set either by a higher layer device, or configured using other means such as hardware mode configuration pins on the PHY device. Also, LS_RX_EN may default to either active or inactive following a reset or power on (of the PHY), for example, depending on the preference of the higher layer devices or hardware pins. LS_TX_EN and LSAV may preferably default to true to allow operation in LS mode if other conditions, discussed above for LS mode of operation, are met.

Additionally, embodiments allow LS mode to be applied as permanent operating mode, or in conjunction with various other network device modes, as appropriate. For example, LS mode may be entered, not just during D3 or WOL power states, but also to reduce power consumption during intermediate low power modes such as D1 or D2.

Prior art PHYs send constant idle pulses or symbols to a partner PHY when data communications are at a minimum, when in any D0-D3 state, or when in any WOL state, in order to tell the partner not to drop the link just because no data is being received. Similarly, in an embodiment, an LS network device should be able to "hold" the link by using occasional LSPs comprising data, idle pulses, or idle symbols, as will be further explained below. However, various other appropriate systems for holding the link between LS network devices may also be used.

In an embodiment, in order to detect a removed cable, unplugged cable, broken cable, non-functional partner PHY, or powered-off partner PHY, an LSP receive timer may be implemented that detects if LSPs are being timely received. If no LSPs are received from the partner PHY within the period defined by the parameter LSP Expiration (LSP_Exp), the link is assumed to be broken. When the link is assumed broken, the PHY will fall back to the Auto-Negotiation state 410, as shown in FIG. 4, or to a reset state defined for the PHY device. Furthermore, an internal link status flag, LINK_STATUS, may be active while LSPs are received and the timer has not timed out, and set to false when no LSPs are received for a period exceeding the allowed time limit of LSP_Exp (i.e. timer has timed out).

e. Link Suspend Packets

In prior art systems, in order to allow for any future communications, it is necessary for a PHY to stay fully powered, continually transmitting data frames interlaced with idle symbols or pulses. These idle pulses typically contain a specific pattern of low level symbols, that may require less power to transmit across the media or wire, but are enough to keep the receiver of a partner PHY locked on. Hence in link suspend mode it is still necessary to keep some type of link relationship between the PHY transmitter and the partner PHY receiver. The relationship is maintained with Link Suspend Packets (LSPs) that cause the partner PHY receiver into holding onto the link. The partner PHY is capable of sending return LSPs, normal idle pulses, data frames, or a WOL of a "D3-hot" state PHY. Thus, LSPs are sent periodically to keep the link ready and in "standby" state for further communication, and to keep the link from resetting (e.g. resetting before receiving a data packet).

Figure 7:
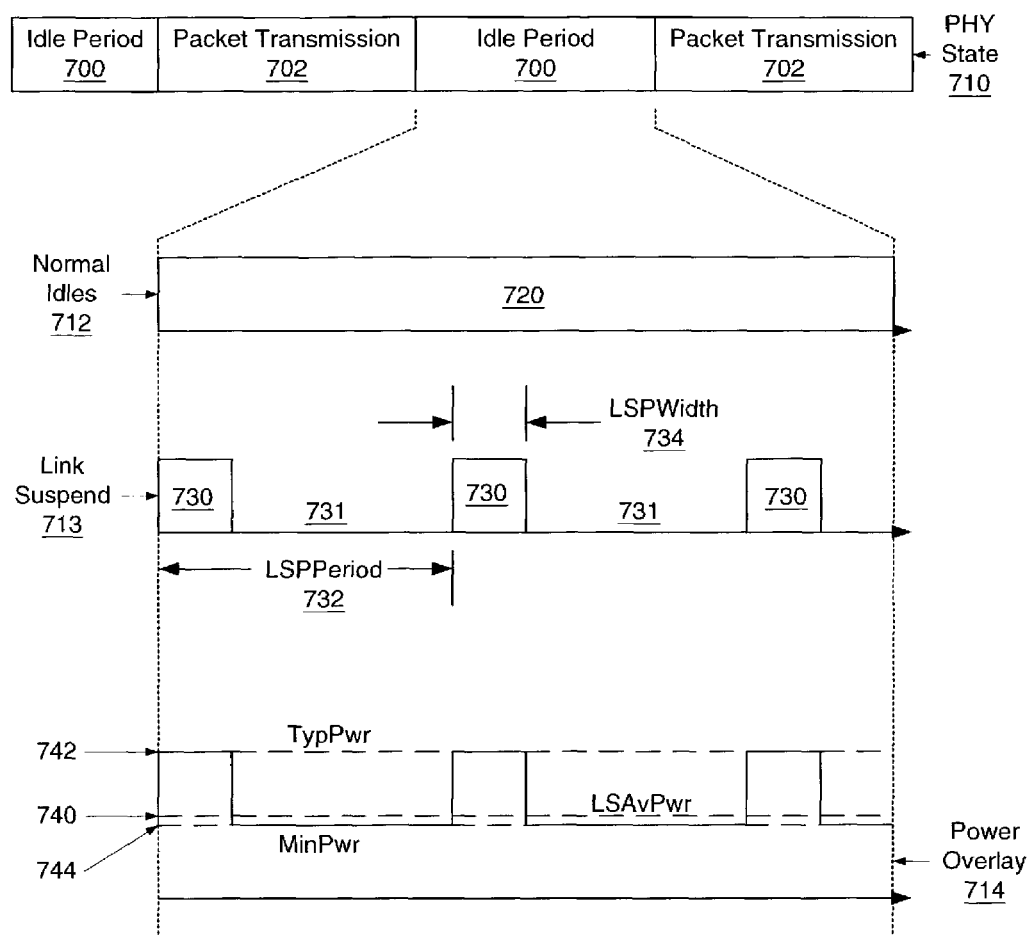
FIG. 7 is an illustration showing the difference in power consumption between transmissions of standard idles and Link Suspend Packets, in accordance with an embodiment of the invention.

FIG. 7 is an illustration showing the difference in power consumption between transmissions of standard idles and Link Suspend Packets, in accordance with an embodiment of the invention. The first waveform of FIG. 7 shows continuous idle periods and data packets transmissions 710, having Idle Periods 700 interspersed between data Packet Transmissions 702 during normal network interface communications. Power consumption during idle period 700 is shown in expanded view in waveforms 712, 713, and 714. The second waveform 712 shows power consumption 720 during transmission of continuous normal idles of a non-LS PHY where normal idles are continuously transmitted to keep a partner receiver "locked on". The third waveform 713 shows power consumption of an LS mode PHY during Idle Periods 700 which comprises periodic high consumption pulse 730 during transmission of Link Suspend Packets (LSPs), and the transmitter off regions 731 (i.e., during Silent Line State 440) between LSP transmissions. The LSPs occur at an LSP period (e.g. LSPPeriod) 732 and occur for an LSP width (e.g. LSPWidth) 734. The fourth waveform 714 is an overlay of the power consumptions of an LS mode PHY and a non-LS mode PHY (i.e., waveforms 712 and 713 superimposed).

As described earlier, link-suspend pulses (LSPs) are used to replace standard idles or normal idle transmissions, while in the link-suspend mode. The purpose of the LSPs is to indicate the presence of a valid link to a remote link partner as an alternative to the standard scrambled idle stream, while providing the ability to conserve power within the PHY device and on the physical media.

The average link suspend power (e.g. LSAvPwr 740) consumed by a PHY during the link suspend idle state (i.e., the period comprising SLS and LSP transmissions) can be calculated by comparing the typical power consumption (e.g. TypPwr 742) of a PHY during normal idle state, and the minimal power consumption (e.g. MinPwr 744) of a PHY between link suspend pulses. Hence, using the definitions for LSAvPwr, TypPwr, MinPwr, LSPWidth, and LSPPeriod given thus far, the power consumption for the LS mode PHY in a steady state condition is given by the following equation:

$$LSAvPwr=((TypPwr)*(LSPWidth/LSPPeriod))+\\((MinPwr)*((LSPPeriod-LSPWidth)/LSPPeriod))$$

Using example values of 85 microseconds for LSPWidth 734 and 256,000 microseconds for LSPPeriod 732, from the equation given above, LSAvPwr can be calculated as follows:

$$LSAvPwr=((TypPwr)*(85/256085))+((MinPwr)*\\((256085-85)/256085))$$

$$LSAvPwr=((TypPwr)*(0.0003))+((MinPwr)*(0.9997))$$

$$LSAvPwr\sim MinPwr$$

Thus, LSAvPwr is roughly equal to the MinPwr consumption of the PHY when its transmitter is turned off. For example, assuming a typical PHY consumes roughly 330 mW during standard idle. Then, during link suspend idle state, from present estimates, the PHY could consume as little as 50-70 mW, i.e. an 80-85% reduction in power.

Additionally, for network devices having numerous LS capable PHYs, such as a switch for example, the power savings will be multiplied by the number of LS capable PHYs linked to other partner LS capable PHYs. Thus, for a switch having multiple LS capable PHYs interfaced to multiple LS network devices (NICs for example, each having only a single PHY), the NICs and the switch benefit in an 80-85% power savings for each PHY-PHY link which enjoys the low power LS mode.

f. LSP Composition

In link suspend mode, the period when no data transmission is occurring between the two linked PHY partners comprises transmission of link suspend packets or pulses (LSPs) between periods of silent line state (SLS). In SLS, it is advantageous for a PHY to shut down components that are not in use (such as the transmitter and some receiver functions) in order to conserve power since there is no communication between the PHY partners. Since it is possible that no signal is present on the line or media dependent interface (MDI) during SLS, a receiving PHY has no phase information about an incoming signal. However, the phase of an incoming signal needs to be acquired for the signal to be properly received. Moreover, if the incoming signal is scrambled, then the seed of scrambled data need be present for the data to be received and descrambled. Thus, embodiments of the invention implement periodic bursts or transmission packets (known as LSPs) having a specific nature or structure. These bursts or packets allow for the link suspended devices (e.g., PHYs in SLS) to maintain link. In addition, these bursts or packets provide enough information for the link suspended devices (e.g., PHYs in SLS) to recover the data clock so that it can lock onto the incoming signal. For example, bursts or packets having a specific nature or structure may be passed periodically between the transmitter of one PHY in link suspend mode and the receiver of the link partner PHY in link suspend mode to let the receiver of the link partner PHY know that the link is still up and to give the link partner PHY information so that it can effectively receive data.

In an embodiment, an LSP indicates the presence of a link partner in link suspend mode to facilitate a lower power mode of operation for either one or both linked PHYs. The frequency of an LSP can be set to any specific value that can be designed into a PHY. The frequency may be fixed or programmable. LSPs may be sent uni-directionally or bi-directionally between a PHY and its link partner. Specific implementations might require LSPs, for example, to be only sent from the PHY on the NIC to the partner PHY on the switch and not in the other direction. On the other hand, some implementations might require LSPs to be sent from both the NIC's PHY and the switch or hub's PHY.

In an embodiment of the invention, LSPs can be implemented a number of ways: from single electrical pulses to bursts comprising standard idles, and/or specially coded symbols. For example, the LSP may comprise of some of the unused symbols of a particular coding scheme (such as any unused symbols in a standard IEEE 802.3 coding scheme) in order to distinguish the LSP from data frames or standard idle patterns, thus making LSP detection easier. Also, in one embodiment, it may be desirable to replace 10BASE-T mode normal link pulses (NLPs) with LSPs that uses the same pulse type as NLPs but with a longer period.

In an embodiment, for 1000BASE-T, where each of four pairs of signal links employs a duplex transmission approach, four simultaneously transmitted LSPs may be used. Also, an embodiment, may shut down one or more of the four duplex transmission links during link-suspend idle and use a fewer number of link pairs, or even a single pair if possible, to transmit LSPs and assure resynchronization of partner LS network device receivers.

Referring back to FIG. 7, in an embodiment for a 100BASE-TX link, when link-suspend mode is enabled and active, a LS Switch PHY transmitter will start sending LSPs within the timeframe LSPPeriod 732 less LSPWidth 734, following the end of a valid frame 702.

According to an embodiment of the invention, an LSP begins with an unscrambled, predetermined and/or predictable preamble. The use of an LSP with an unscrambled and known preamble allows for easy detection of LSPs. In an embodiment, the nature of the LSP, allows a receiving PHY to quickly lock its receive clock to incoming data and quickly nibble align to the incoming data (e.g., the phase of the data signal) so that it can recover the data.

Figure 11:
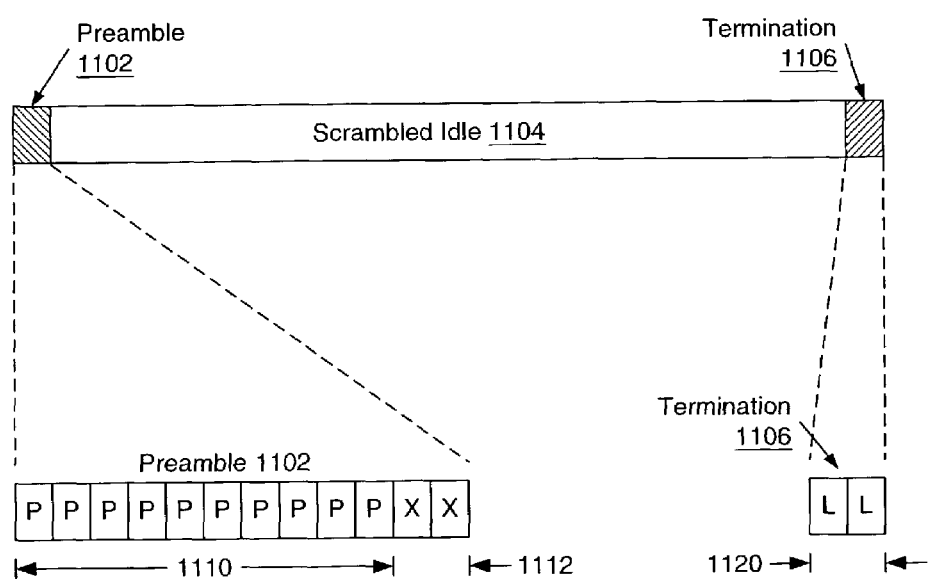
FIG. 11 is an illustration of the portions of a Link Suspend Packet, in accordance with an embodiment of the invention.

FIG. 11 is an illustration of the portions of a Link Suspend Packet, in accordance with an embodiment of the invention. As shown in FIG. 11, each LSP is made up of three parts: a preamble 1102, a scrambled idle 1104, and termination symbol 1106. In this illustration, the preamble uses symbols such as "P" and "X", while the termination uses the "/L/L/" symbols.

In one embodiment, the first 12 symbols of the LSP, i.e., the preamble, are unscrambled. In this illustration, the first 10 symbols are "P" symbols 1110 and the next two symbols are "X" symbols 1112. The "X" symbols are used for resetting the receiver descrambler. The use of an unscrambled preamble sequence allows the receive state machine to nibble align on a known input stream. Thus, the use of an unscrambled preamble lets the receiver avoid the need to reacquire the scrambler starting seed of the transmitter, which would be necessary if the preamble were scrambled. So, while in link suspend mode, the receive state machine needs only to monitor for a specific incoming data sequence (e.g., a number of consecutive "P"s where "P" could be the pattern "11011"). The unscrambled pattern (e.g., "P") should have a known transition density so that it is capable of being easily detected and used.

After nibble aligning using some or all of the "P" symbols, the "X" codes may then be used to unlock the descrambler of the receiver. Then, if the seed of the link partner's transmit scrambler is passed during auto-negotiation, the receiver can use this seed to quickly recover the pattern of the scrambled idle sequence 1104 which follows preamble 1102. Hence, the use of unscrambled preamble and seed information passed during auto-negotiation allows the receiver to recover clock and lock to incoming LSP or data so as not to lose any data when coming out of SLS.

Note that, where IEEE 802.3 is the prescribed standard, the use of an unscrambled sequence with 12 symbols to lock the receive clock and align the incoming data may be adequate in some embodiments, because 12 symbols remain under the maximum of 16 nibbles specified for the preamble by the IEEE 802.3 standard. Moreover, the first 12 symbols of the LSP can be used as the first 12 symbols of the data preamble, in substitution for the existing IEEE 802.3 standard preamble, thereby while still providing complete IEEE 802.3 compatibility, information is provided for locking of the receive clock in order to align to the incoming data.

The invention also contemplates various other appropriate unscrambled, predetermined and/or predictable preambles, comprised of a unique sequencing of code. For instance, if the receive PLL can be locked with fewer symbols than 12, then fewer symbols can be used. The upper bound of the number of symbols (e.g., 16 for IEEE 802.3) may be set by the allowable number of symbols between TX_EN high and data arrival. Embodiments of the invention allow the LSP and the preamble data to use the same first 12 symbols; thus reducing the state machine complexity. In addition, the invention can work within the frame definition for data packets set forth in the IEEE 802.3 or any other standard. Moreover, various embodiment may use LSPs having a fixed length or signal time period of unscrambled preamble, in order to minimize the time required for the receiver to lock to incoming signal. Additionally, various embodiments may use LSPs comprised of high transition signals for various reasons including easy detection.

According to an embodiment, the unscrambled preamble may also serve the important purpose of allowing for quick clock recovery. During SLS, the receiver may not have knowledge of the phase of the signal patterns to be received. By using a known, unscrambled pattern at the beginning of the LSP, the receiver can be designed or operated with this pattern in mind to quickly recover the data clock. Since the receiver can acquire clock by looking at the edges of the incoming signal, the use of a high transition density symbol for "P" can further augment clock recovery. Thus, the LSP can be uniquely constructed to facilitate fast clock recovery, nibble alignment, scrambler starting seed detection, receive state machine control, and signal detection.

Note that the invention also contemplates various other appropriate known unscrambled preamble patterns in order to allow for clock recovery. For instance, other patterns which do not have high transition densities, are not already known to the receiver (e.g., but are predictable), or are scrambled may be used. The key is to allow the receiving PHY receiver which is monitoring a line with no signal, to successfully detect an incoming signal, recover that signal's data (e.g., including clock lock to the phase of the bits and sampling of the data to align with the sequence of the data words), and de-scramble any scrambled data segments (e.g., using scrambler seed information).

An alternate embodiment uses a scrambled sequence for the LSP preamble. The receiver can then acquire the descrambler seed using the scrambled LSP. However, a scrambled sequence embodiment may require multiple receive clocks, since the number of allowed scrambled sequences can be on the order of $10^{11}$. In addition, the incoming sequence should have sufficient transitions to allow the receiver to acquire the proper seed information in adequate time.

According to an embodiment, scrambled idle 1104 of the LSP may be used to "retrain" the equalizer loops. Any changes in the incoming signal need to be accounted for and equalized out by the receiver. Thus, one purpose of the scrambled IDLE sequence in Link Suspend devices is to allow the equalizers time to decay the DC content imposed on the MDI by the previous data. The pseudo-random nature of the scrambled IDLE signal allows any offset imposed by the transmitted packet to decay. An example would be the changes in the signal due to temperature variations. Thus, the scrambled idle symbols can be used to adjust the equalizer loops to these changes. For instance, a typical time duration for the scrambled idle would be approximately 100 µs, which translates to greater than 10,000 clocks for 100BASE-TX. So, during the 10,000-clock duration of the scrambled idle, the receiver has time to adapt to the changes.

Note that the invention also contemplates various other appropriate scrambled idle sequences in order to "retrain" the equalizer loops. For instance, other sequences that allow changes in the incoming signal to be accounted for and equalized out by the receiver may be used.

Also, according to an embodiment, termination symbols 1106 is used to terminate the LSP and reenter SLS. For instance, when the transmitter sends the "/L/L/" symbols 1120 (see FIG. 11), the transmitter knows it may reenter SLS. Hence, upon entering SLS the transmitter as well as other circuitry not required during SLS can be shut down, thus saving power without causing a renegotiation of the link. Similarly, when the receiver receives the "/L/L/" symbols, it may take the appropriate action to prepare for the transmitting PHY's possible re-entry into SLS (e.g., the receiver freezes its equalizer loops).

The invention contemplates using termination portions that are scrambled or unscrambled. Similar to the receiver's unscrambling of the scrambled idle, since the seed of the link partner transmit scrambler can be passed during auto-negotiation, the receiver can also use the seed to quickly recover the pattern of a scrambled termination portion of the LSP (e.g., 1106) which follows scrambled idle 1104. The receive state machine, while in link suspend mode, monitors for the "/L/L/" symbols (scrambled or unscrambled). When the termination symbols are detected, the receiver loops are signaled to "freeze".

Note that the invention also contemplates various other appropriate termination symbols in order to reenter SLS. For instance, other scrambled or unscrambled, and/or transition rich or transition bare sequences that provide the necessary environment and time for the receiver to reenter SLS and/or "freeze" the receiver loops may be used.

An alternative embodiment provides for letting the receive state machine monitor for loss of signal, in order to freeze the loops. Monitoring for loss of signal may lead to an associated delay before entering SLS which may be avoided by using appropriate termination symbols.

g. Handling of Data Transmission Request

Embodiments of the invention provide for arrival of data at the LS capable PHY at any time for transmission while the PHY is in link suspend mode (e.g., in SLS or transmitting LSP). Therefore, the LSP is constructed such that if Transmit Enable is asserted (TX_EN=True) during link suspend operation, e.g., during SLS or LSP transmission, data is not lost at the transmitting PHY or at the receiving PHY.

Figure 12:
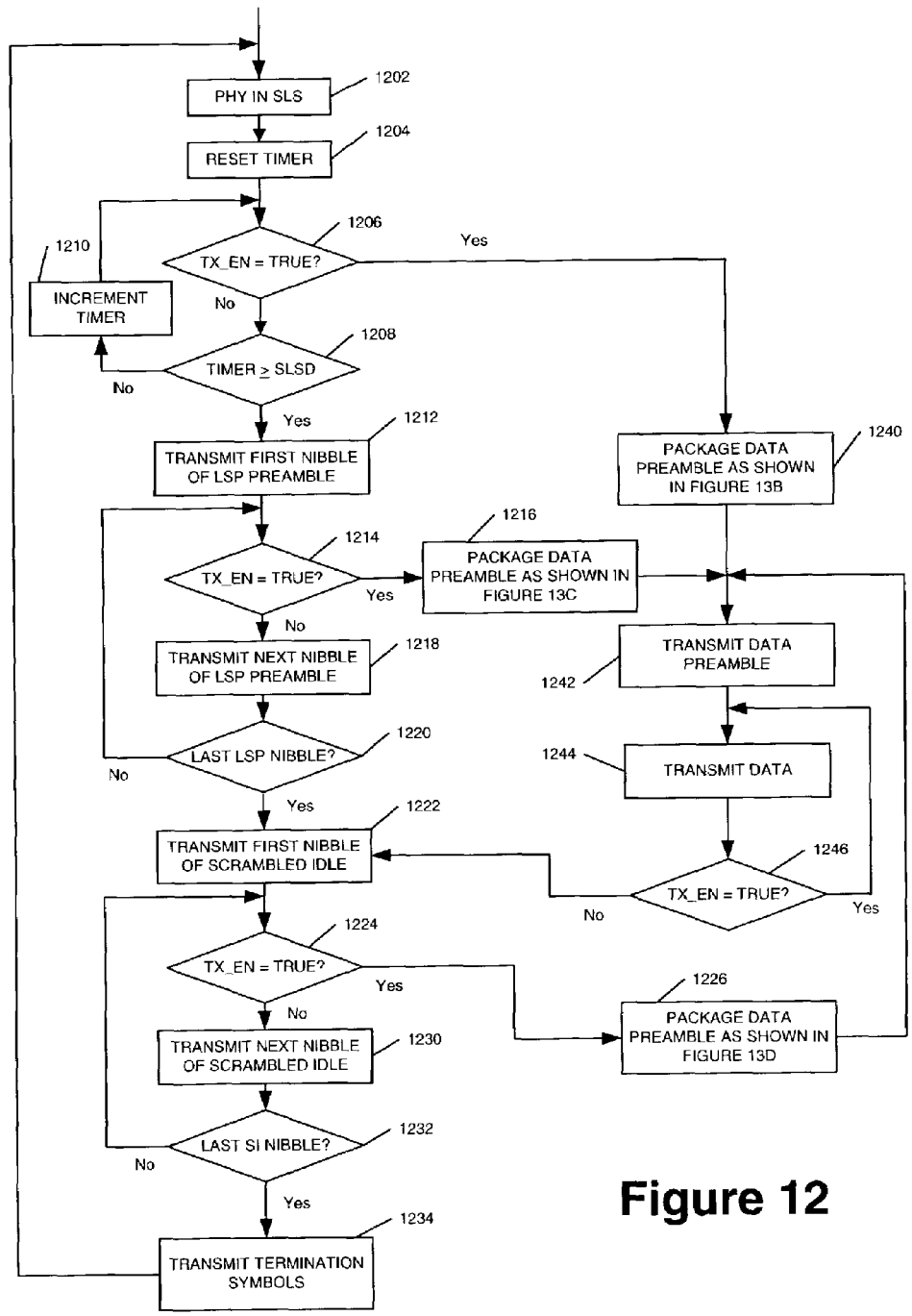
FIG. 12 is a flow diagram illustrating the handling of data transmission request while in link suspend mode, in accordance with an embodiment of the invention.
Figure 13A:
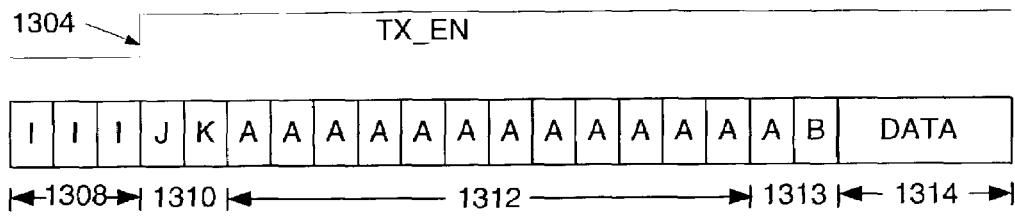
FIG. 13A shows an example of a data preamble for a PHY operating in the IEEE 802.3 format where data arrives at the MAC of a PHY for transmission to a partner PHY during scrambled idle.

FIG. 12 is a flow diagram illustrating the handling of data transmission request while in link suspend mode, in accordance with an embodiment of the invention. Data transmission request is signaled by the MAC setting a transmit enable (TX_EN) discrete to true thereby signaling to the PHY transmitter that it is time to send data to the partner PHY. Thus, since a LS capable PHY may be in one of several states at any one time, e.g., the IEEE 802.3 Standard Idle state 420, the LS state 430, or the SLS 440, handling of the request to start transmission of data will vary depending on the state of the PHY transmitter. For example, the standard protocol (e.g., IEEE 802.3) may require data transmission to start no more than 16 nibbles after TX_EN became true and that certain sequences of information be sent to the receiver of the partner PHY so that it will be ready to start receiving the data. An example symbol sequence is shown in FIG. 13A for the IEEE 802.3 standard. In the following discussions, FIGS. 12 and 13A-D will be discussed interchangeably.

FIG. 13A shows an example of a data preamble for a PHY operating in the IEEE 802.3 state 420 where data arrived at the MAC of a PHY for transmission to a partner PHY during scrambled idle. As shown in FIG. 13A, when TX_EN is asserted at 1304 (i.e., during scrambled idle 1308), the PHY transmits the "J" and "K" symbols 1310 as the first two nibbles. Then the PHY transmits the encoding requirement of IEEE 802.3 (e.g., 4B/5B) in the remaining 14 nibbles (e.g., 1312 and 1313) of the data preamble. For example, the first 12 nibbles (i.e., 1312) of the remaining 14 nibbles are the 4 bit code group "1010" for each nibble, and the last 2 (i.e., 1313) which denote start of data is represented by "AB". Thus, the 16 nibbles of the IEEE 802.3 data preamble sequence, in the 5B symbol domain, consists of the two Start-of-Stream Delimiter (SSD) symbols "JK", followed by 12 symbols of "A" (the encoded "1010" pattern), followed by the Start Frame Delimiter (SFD) symbol sequence "AB".

A partner PHY receiver monitors the MDI for the transition from scrambled idle 1308 to the "J" state (i.e., "IJ" transition at the beginning of 1310), that indicates the link partner's transmit has been enabled. It then replaces the Start-of-Stream Delimiter (i.e., "JK") 1310 with two decoded "A" symbols, "10101010". It decodes the remaining 12 "A" symbols 1312. Finally, Start of Frame Delimiter ("AB") 1313, which indicates that what follows is data 1314, is decoded. Thus, the receiver sees 14 symbols of "A" (i.e., "1010") followed by "AB" before arrival of data. The receiver may then assert a Receive Data Valid (RX_DV) bit at any time during the preamble, but no later than the SFD, to tell the transmitter that it is properly receiving data.

However, according to an embodiment, a link suspend capable PHY in link suspend mode may not transmit the standard preamble (FIG. 13A), since the line may be silent prior to the arrival of the preamble to data. For example, it is possible that in SLS, the partner PHY's receiver may not see the "IJ" transition (i.e., SSD) since it is not expecting any data. Moreover, although the PHY's transmitter has no knowledge of the state of the partner PHY's receiver when in link suspend mode, the PHY should be ready to transmit data at any time to prevent loss of data. Thus, embodiments of the present invention vary the data preamble depending on the state of the LS mode PHY.

Referring back to FIG. 12, at block 1202, the PHY transmitter enters silent line state, i.e., a state where the communication line from the PHY transmitter to the partner PHY receiver is silent. In one or more embodiments, silent line state is normally entered after a PHY receives the proper termination symbol sequence, e.g., /L/L/ following a scrambled idle sequence. Note that in this specification, the termination symbol /L/L/ is referred to interchangeably as the Silent Line Delimiter (SLD) symbol.

At block 1204, a timer (or counter) is started to keep track of the time in silent line state (SLS) (since the PHY may not be in SLS for more than a fixed duration of time). Generally, the time in SLS may not exceed a Silent Line State Duration (SLSD) time limit, which may be programmed into the PHY. The SLSD may be a parameter passed to the partner PHY during auto-negotiation. Exceeding SLSD while in SLS may cause the partner PHY to declare the link as failed and thus return to auto-negotiation state 410 to re-negotiate the link. Thus, each PHY must keep track of its duration in SLS. During silent line state, if the PHY transmitter detects the assertion of transmit enable (i.e., TX_EN=true) at block 1206, it proceeds to create a data preamble (e.g., at block 1240) which comprises the preamble of the LSP as shown in FIG. 13B.

Figure 13B:
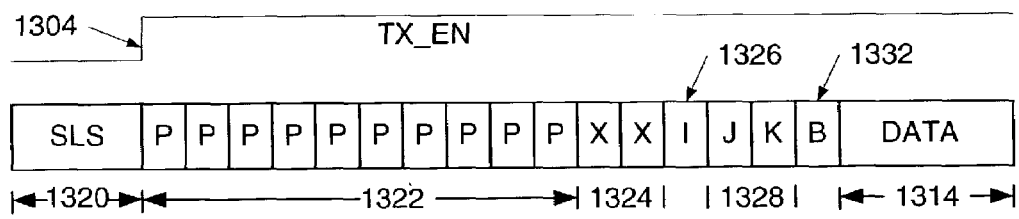
FIG. 13B is an illustration of the data preamble where transmit enable became asserted while an LS mode PHY is in Silent Line State, in accordance with an embodiment of the present invention.

FIG. 13B is an illustration of the data preamble where transmit enable (TX_EN=true) occurred while an LS mode PHY is in Silent Line State, in accordance with an embodiment of the present invention. The construct of the LSP and data preamble transmitted during LS mode should be in compliance with existing standards (e.g., IEEE 802.3) in order to assure proper assertion of the receive data valid (RX_DV) bit by the partner PHY. Thus, as shown in FIG. 13B, for TX_EN high (e.g., at 1304) during SLS 1320, the transmitter transmits the preamble that is very similar to that of the LSP preamble (See FIG. 11), in accordance with an embodiment of the invention. The preamble for data transmitted during LS mode here consists of 10 "P" symbols 1322, followed by 2 "X" symbols 1324, followed by scrambled idle ("I") 1326, followed by the Start-of-Stream Delimiter ("JK") 1328, and finally "B" 1332. The "X" symbols are special unscrambled code groups that are used in the LSP to unfreeze the receiver descrambler. Thus, by detecting the "X" symbols, the receiver can quickly lock to the seed of the link partner's 4B/5B encoder. Similar to the preamble part of a LSP, the "P" and "X" symbols of the preamble for data transmitted during LS mode are unscrambled to allow for fast clock recovery, nibble alignment, and descrambler lock by the receiving PHY. The "P" symbol is a signal with high transition density ("11011"), by sending enough "P" symbols, the receiver, which may miss one or two of the symbols because it may need to power up some circuitry, is able to quickly align and prepare for the remaining incoming code sequences.

The receiving PHY replaces the SSD 1328 with the decoded "AA" ("10101010"), just as a non-link suspend capable PHY would or a LS capable PHY that is not in LS mode (e.g., cases described for FIG. 13A). The SSD 1328 is followed by the symbol "B", and then data 1314. Because the receiver replaces SSD 1328 with the "AA" symbol, the SFD is again "AB", just as in the case without link suspend (e.g., see FIG. 13A). The receive data valid bit (RX_DV) is asserted at the detection of the SFD, as may be the case in the non-link suspend case (e.g., FIG. 13A).

Note that the invention also contemplates various other appropriate known unscrambled data preamble patterns for transmission of data in LS mode during SLS in order to allow for fast clock recovery, nibble alignment, and descrambler lock by the receiving PHY. For instance, other scrambled or unscrambled sequences that provide the necessary environment and time for the receiver to recover the data clock and thus align with incoming data during SLS may be used.

Referring back to FIG. 12, at block 1242, the data preamble (FIG. 13B) is transmitted followed by the data at block 1244. Data transmission continues so long as TX_EN remains true (i.e., end of data is not encountered) as determined at block 1246. However, if at block 1246 TX_EN becomes false, control is transferred to block 1222 for transmission of scrambled idle. Transmit enable may become false due to end of data for transmission whereby an End of Stream Delimiter may also be transmitted as mandated by the operating standard protocol (e.g., /T/R/ for IEEE 802.3 standard). At block 1222, since scrambled idle may be transmitted for a fixed period of time, transmission starts with the first nibble of scrambled idle (SI). If during transmission of SI, transmit enable becomes true (e.g., at block 1224), control goes to block 1226 where the data preamble is generated as shown in FIG. 13D. FIG. 13D is an illustration of the data preamble where transmit enable occurred while an LS mode PHY is transmitting the scrambled idle portion of a Link Suspend Packet, in accordance with an embodiment of the present invention. Note that the preamble shown in FIG. 13D has the same structure as that in FIG. 13A thus the descriptions are the same. After the preamble is generated in block 1226, control returns to block 1242 to transmit the data preamble and then to block 1244 to transmit the data.

However, if at block 1224, transmit enable is not true, then the next nibble of SI is transmitted at block 1230. The cycle of SI transmission continues until the last nibble of SI is transmitted. If the last nibble is not transmitted (as determined in block 1232), then control returns back to block 1224 to check for transmit enable. This cycle continues until the last nibble of SI is transmitted. After the last nibble of scrambled idle is transmitted, control goes to block 1234 for transmission of the termination symbols, i.e., Silent Line Delimiter (SLD) symbols. The SLD may be the same termination symbols used for the LSP. After the termination symbols, the PHY transmitter then returns back to the silent line state at block 1202.

Returning back to block 1206, if it is determined that TX_EN is false at block 1206, i.e., transmit enable did not occur when PHY is in SLS, then the transmitter remains in SLS so long as the timer value is less than Silent Line State Duration (SLSD). Thus at block 1208, a check is made whether timer is greater than or equal to SLSD, if false, the timer is incremented at block 1210 and control returns to block 1206 to continue the SLS wait. However, if the timer is greater than or equal to SLSD, control goes to block 1212 where the first nibble of the LSP preamble is transmitted. In one or more embodiments, an LSP must be transmitted at the end of SLSD to prevent link shutdown. Thus, at block 1212, the first nibble of the LSP preamble is transmitted. At 1214 a determination is made whether transmit enable is true (i.e., TX_EN=true) during LSP preamble transmission. If transmit enable is not true, then the next nibble of the LSP preamble is transmitted in block 1218 followed by a determination in block 1220 whether the transmitted nibble is the last nibble of the LSP preamble. If it is the last nibble of the LSP preamble, control flows to block 1222 to start transmission of scrambled idle as described above. Otherwise, control flows back to block 1214 to continue and finish the transmission of LSP preamble.

Figure 13C:
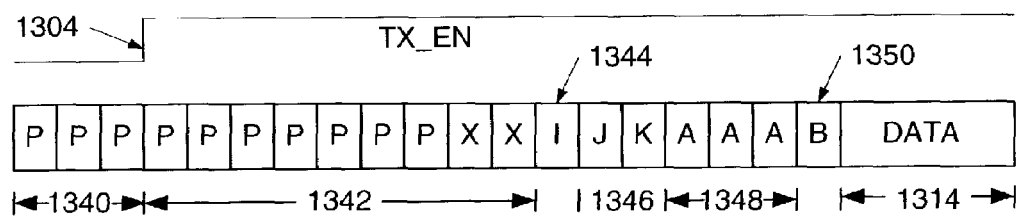
FIG. 13C is an illustration of the data preamble where transmit enable became asserted while an LS mode PHY is transmitting the preamble of the Link Suspend Packets, in accordance with an embodiment of the present invention.
Figure 13D:
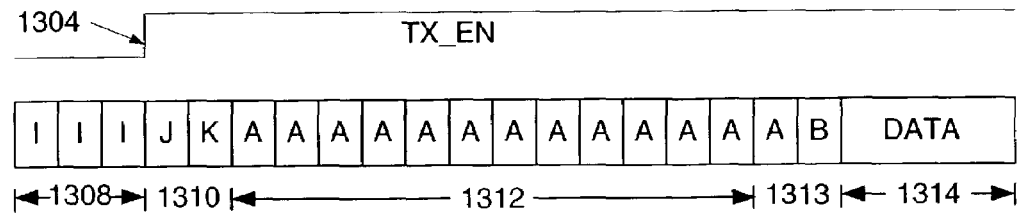
FIG. 13D is an illustration of the data preamble where transmit enable became asserted while an LS mode PHY is transmitting the scrambled idle portion of the Link Suspend Packets, in accordance with an embodiment of the present invention.

If, however, at block 1214 a determination is made that transmit enable became true (i.e., TX_EN=true) during LSP preamble transmission, control flows to block 1216 to generate the data preamble as shown in FIG. 13C.

FIG. 13C is an illustration of the data preamble where transmit enable (TX_EN=true) occurred while an LS mode PHY is transmitting the preamble of a Link Suspend Packet, in accordance with an embodiment of the present invention. The construct of the LSP and data preamble transmitted during LS mode is in compliance with existing standards (e.g., IEEE 802.3) in order to assure proper assertion of the receive data valid (RX_DV) bit by the partner PHY. Thus, as shown in FIG. 13C, if TX_EN is true at 1304, which is after the first few nibbles (i.e., 1340) of the LSP preamble has been transmitted, the PHY transmitter continues transmission of the LSP preamble but notes how many nibbles of the preamble were transmitted before transmit enable became true so that it can create the proper data preamble.

Thus, for instance, if transmit enable is asserted (i.e., TX_EN=true) at 1304, which is after the transmitter has sent the first three nibbles (i.e., 1340) of the LSP preamble, then the data preamble created comprises the remaining symbols of the LSP preamble (i.e., 1342), followed by a nibble of scrambled idle 1344, followed by the Start-of-Stream Delimiter (SSD) 1346. Following the SSD (i.e., 1346), the transmitter uses enough "A" symbols (i.e., 1348) in place of the number of LSP preamble symbols (i.e., 1340) transmitted prior to transmit enable going true. Thus, in FIG. 13C, three "A" symbols (i.e., 1348) are transmitted as padding to the data preamble since the first three "P" symbols (i.e., 1340) of the LSP were transmitted prior to TX_EN being asserted at 1304. The data preamble then includes the "B" symbol following the "A" padding symbols such that the last "A" symbol and the "B" symbol make up the Start Frame Delimiter (SFD) symbol.

Referring back to FIG. 12, control flows from block 1216 to block 1242 where the data preamble is transmitted to the partner PHY. The partner PHY receiver that sees SSD (i.e., "JK") 1346, knows that data 1314 is coming, and replaces the SSD with the decoded "AA" ("10101010") symbols, just as a non-link suspend capable PHY would or a LS capable PHY that is not in LS mode (e.g., cases described for FIG. 13A). The receiver parses the symbols that follow the SSD (i.e., "JK"), and again uses the "AB" symbol as the SFD. In this case also, RX_DV is asserted with the detection of the SFD. From block 1242, control continues as previously described.

Note that the invention also contemplates various other appropriate known unscrambled data preamble patterns for transmission of data in LS mode during LSP preamble in order to allow for fast clock recovery, nibble alignment, and descrambler lock by the receiving PHY. For instance, other scrambled or unscrambled sequences that provide the necessary environment and time for the receiver to recover clock and align with incoming data during LSP preamble may be used.

h. LS Modified MII Control and Registers

Embodiments of the invention provide for arrival of data at the LS capable PHY at any time for transmission while the PHY is in link suspend mode (e.g., in SLS or while transmitting LSPs). Therefore, the LSP is constructed such that if Transmit Enable is asserted (TX_EN=True) during link suspend operation, e.g., during SLS or LSP transmission, data is not lost at the transmitting PHY or at the receiving PHY.

FIG. 12 is a flow diagram illustrating the handling of data transmission request while in link suspend mode, in accordance with an embodiment of the invention. Data transmission request is signaled by the MAC setting a transmit enable (TX_EN) discrete to true thereby signaling to the PHY transmitter that it is time to send data to the partner PHY. Thus, since a LS capable PHY may be in one of several states at any one time, e.g., the IEEE 802.3 Standard Idle state 420, the LS state 430, or the SLS 440, handling of the request to start transmission of data will vary depending on the state of the PHY transmitter. For example, the standard protocol (e.g., IEEE 802.3) may require data transmission to start no more than 16 nibbles after TX_EN became true and that certain sequences of information are sent to the receiver of the partner PHY so that it will be ready to start receiving the data. An example symbol sequence is shown in FIG. 13A for the IEEE 802.3 standard. In the following discussions, FIGS. 12 and 13A-D will be discussed interchangeably.

FIG. 13A shows an example of a data preamble for a PHY operating in the IEEE 802.3 state 420 where data arrives at the MAC of a PHY for transmission to a partner PHY during scrambled idle. As shown in FIG. 13A, when TX_EN is asserted at 1304 (i.e., during scrambled idle 1308), the PHY transmits the "J" and "K" symbols 1310 as the first two nibbles. Then the PHY transmits the encoding requirement of IEEE 802.3 (e.g., 4B/5B) in the remaining 14 nibbles (e.g., 1312 and 1313) of the data preamble. For example, the first 12 nibbles (i.e., 1312) of the remaining 14 nibbles are the 4 bit code group "1010" for each nibble, and the last 2 (i.e., 1313) which denote start of data is represented by "AB". Thus, the 16 nibbles of the IEEE 802.3 data preamble sequence, in the 5B symbol domain, consists of the two Start-of-Stream Delimiter (SSD) symbols "JK", followed by 12 symbols of "A" (the encoded "1010" pattern), followed by the Start Frame Delimiter (SFD) symbol sequence "AB".

A partner PHY receiver monitors the MDI for the transition from scrambled idle 1308 to the "J" state (i.e., "IJ" transition at the beginning of 1310), that indicates the link partner's transmit has been enabled. It then replaces the Start-of-Stream Delimiter (i.e., "JK") 1310 with two decoded "A" symbols, "10101010". It decodes the remaining 12 "A" symbols 1312. Finally, Start of Frame Delimiter ("AB") 1313, which indicates that what follows is data 1314, is decoded. Thus, the receiver sees 14 symbols of "A" (i.e., "1010") followed by "AB" before arrival of data. The receiver may then assert a Receive Data Valid (RX_DV) bit at any time during the preamble, but no later than the SFD, to tell the transmitter that it is properly receiving the data.

However, according to an embodiment, a link suspend capable PHY in link suspend mode may not transmit the standard preamble (FIG. 13A), since the line may be silent prior to the arrival of the preamble to data. For example, it is possible that in SLS, the partner PHY's receiver may not see the "IJ" transition (i.e., SSD) since it is not expecting any data. However, although the PHY's transmitter has no knowledge of the state of the partner PHY's receiver when in link suspend mode, the PHY should be ready to transmit data at any time to prevent loss of data. Thus, embodiments of the present invention vary the data preamble depending on the state of the LS mode PHY.

Referring back to FIG. 12, at block 1202, the PHY transmitter enters silent line state, i.e., a state where the communication line from the PHY transmitter to the partner PHY receiver is silent. In one or more embodiments, silent line state is normally entered after a PHY receives the proper termination symbol sequence, e.g., /L/L/ following a scrambled idle sequence. Note that in this specification, the termination symbol /L/L/ is referred to interchangeably as the Silent Line Delimiter (SLD) symbol.

At block 1204, a timer (or counter) is started to keep track of the time in silent line state (SLS) (since the PHY may not be in SLS for more than a fixed duration of time). Generally, the time in SLS may not exceed a Silent Line State Duration (SLSD) time limit, which may be programmed into the PHY. The SLSD may also be a parameter passed to the partner PHY during auto-negotiation. Exceeding SLSD while in SLS may cause the partner PHY to declare the link as failed and thus return to auto-negotiation state 410 to re-negotiate the link. Thus, each PHY must keep track of its duration in SLS. During silent line state, if the PHY transmitter detects the assertion of transmit enable (i.e., TX_EN=true) at block 1206, it proceeds to create a data preamble (e.g., at block 1240) which comprises the preamble of the LSP as shown in FIG. 13B.

FIG. 13B is an illustration of the data preamble where transmit enable (TX_EN=true) became asserted while an LS mode PHY is in Silent Line State, in accordance with an embodiment of the present invention. The construct of the LSP and data preamble transmitted during LS mode should be in compliance with existing standards (e.g., IEEE 802.3) in order to assure proper assertion of the receive data valid (RX_DV) bit by the partner PHY. Thus, as shown in FIG. 13B, for TX_EN high (e.g., at 1304) during SLS 1320, the transmitter transmits the preamble that is very similar to that of the LSP preamble (See FIG. 11), in accordance with an embodiment of the invention. The preamble for data transmitted during LS mode here consists of 10 "P" symbols 1322, followed by 2 "X" symbols 1324, followed by scrambled idle ("I") 1326, followed by the Start-of-Stream Delimiter ("JK") 1328, and finally "B" 1332. The "X" symbols are special unscrambled code groups that are used in LS mode to unfreeze the receiver descrambler. Thus, by detecting the "X" symbols, the receiver can quickly lock to the seed of the link partner's 4B/5B encoder. Similar to the preamble part of a LSP, the "P" and "X" symbols of the preamble for data transmitted during LS mode are unscrambled. Using an unscrambled preamble allows for fast clock recovery, nibble alignment, and descrambler lock by the receiving PHY. The "P" symbol may be a signal with high transition density e.g., "11011". By sending enough "P" symbols, the receiver, which may miss one or two of the symbols because it may need to power up some circuitry (while waking up from SLS), is able to quickly align and prepare for the remaining incoming code sequences.

The receiving PHY replaces the SSD 1328 with the decoded "AA" ("10101010") symbol, just as a non-link suspend capable PHY would or an LS capable PHY that is not in LS mode (e.g., cases described for FIG. 13A). The SSD 1328 is followed by the symbol "B", and then data 1314. Because the receiver replaces SSD 1328 with the "AA" symbol, the receiver sees an SFD that is again "AB", just as in the case without link suspend (e.g., see FIG. 13A). The receive data valid bit (RX_DV) may then be asserted at the detection of the SFD, as may be the case in the non-link suspend case (e.g., FIG. 13A).

Note that the invention also contemplates various other appropriate known unscrambled data preamble patterns for transmission of data in LS mode during SLS in order to allow for fast clock recovery, nibble alignment, and descrambler lock by the receiving PHY. For instance, other scrambled or unscrambled sequences that provide the necessary environment and time for the receiver to recover the data clock and thus align with incoming data during SLS may be used.

Referring back to FIG. 12, at block 1242, the data preamble (FIG. 13B) is transmitted followed by the data at block 1244. Data transmission continues so long as TX_EN remains true (i.e., end of data is not encountered) as determined at block 1246. However, if at block 1246 TX_EN becomes false, control is transferred to block 1222 for transmission of scrambled idle. At block 1222, since scrambled idle may be transmitted for a fixed period of time, transmission starts with the first nibble of scrambled idle (SI). If during transmission of SI, transmit enable becomes true (e.g., at block 1224), control goes to block 1226 where the data preamble is generated as shown in FIG. 13D. FIG. 13D is an illustration of the data preamble where transmit enable became asserted while an LS mode PHY is transmitting the scrambled idle portion of a Link Suspend Packet, in accordance with an embodiment of the present invention. Note that the preamble shown in FIG. 13D has the same structure as that in FIG. 13A thus the descriptions are the same. After the preamble is generated in block 1226, control returns to block 1242 to transmit the data preamble and then to block 1244 to transmit the data.

However, if at block 1224, transmit enable is not true, then the next nibble of SI is transmitted at block 1230. The sequence of SI transmission continues until the last nibble of SI is transmitted. If the last nibble is not transmitted (as determined in block 1232), then control returns back to block 1224 to check for transmit enable. This cycle continues until the last nibble of SI is transmitted. After the last nibble of scrambled idle is transmitted, control goes to block 1234 for transmission of the termination symbols, i.e., Silent Line Delimiter (SLD) symbols. The SLD may be the same termination symbols used for the LSP. After the termination symbols, the PHY transmitter may then return back to the silent line state at block 1202.

However, if it is determined that TX_EN is false at block 1206 (i.e., transmit enable did not occur when PHY is in SLS), then the transmitter remains in SLS so long as the timer value is less than the Silent Line State Duration (SLSD) timer. Thus at block 1208, a check is made whether the timer has accumulated time greater than or equal to the SLSD, if false, the timer is incremented at block 1210 and control returns to block 1206 to continue the SLS wait. However, if the timer value is greater than or equal to the SLSD, control goes to block 1212 where the first nibble of the LSP preamble is transmitted. In one or more embodiments, an LSP must be transmitted at the end of the SLSD to prevent link shutdown. Thus, at block 1212, the first nibble of the LSP preamble is transmitted. At 1214 a determination is made whether transmit enable became true (i.e., TX_EN=true) during LSP preamble transmission. If transmit enable is not true, then the next nibble of the LSP preamble is transmitted in block 1218 followed by a determination in block 1220 whether the transmitted nibble is the last nibble of the LSP preamble. If it is the last nibble of the LSP preamble, control flows to block 1222 to start transmission of scrambled idle as described above. Otherwise, control flows back to block 1214 to continue and finish the transmission of the LSP preamble.

If, however, at block 1214 a determination is made that transmit enable became true (i.e., TX_EN=true) during LSP preamble transmission, control flows to block 1216 to generate the data preamble as shown in FIG. 13C.

FIG. 13C is an illustration of the data preamble where transmit enable (TX_EN=true) became asserted while an LS mode PHY is transmitting the preamble of a Link Suspend Packet, in accordance with an embodiment of the present invention. The construct of the LSP and data preamble transmitted during LS mode should be in compliance with existing standards (e.g., IEEE 802.3) in order to assure proper assertion of the receive data valid (RX_DV) bit by the partner PHY. Thus, as shown in FIG. 13C, if TX_EN is true at 1304, which is after the first few nibbles (i.e., 1340) of the LSP preamble has been transmitted, the PHY transmitter continues transmission of the LSP preamble but notes how many nibbles of the preamble were transmitted before transmit enable became true so that it can create the proper data preamble.

Thus, for instance, if transmit enable is asserted (i.e., TX_EN=true) at 1304, which is after the transmitter has sent the first three nibbles (i.e., 1340) of the LSP preamble, then the data preamble created comprises the remaining symbols of the LSP preamble (i.e., 1342), followed by a nibble of scrambled idle 1344, followed by the Start-of-Stream Delimiter (SSD) 1346. Following the SSD (i.e., 1346), the transmitter uses enough "A" symbols (i.e., 1348) in place of the number of LSP preamble symbols (i.e., 1340) transmitted prior to transmit enable going true. Thus, in FIG. 13C, three "A" symbols (i.e., 1348) are transmitted as padding to the data preamble since the first three "P" symbols (i.e., 1340) of the LSP were transmitted prior to TX_EN being asserted at 1304. The data preamble then includes the "B" symbol following the "A" padding symbols such that the last "A" symbol and the "B" symbol make up the Start Frame Delimiter (SFD) symbol. Note that this padding scheme is used in this invention to maintain consistency in the number of nibbles transmitted between assertion of transmit enable and data transmission. It should be apparent to those of skill in the art that the padding may not be necessary so long as the preamble is adequate to prepare the receiving PHY for the arrival of data.

Referring back to FIG. 12, control flows from block 1216 to block 1242 where the data preamble is transmitted to the partner PHY. The partner PHY receiver that sees SSD (i.e., "JK") 1346, knows that data 1314 is coming, and replaces the SSD with the decoded "AA" ("10101010") symbols, just as a non-link suspend capable PHY would or an LS capable PHY that is not in LS mode (e.g., cases described for FIG. 13A). The receiver parses the symbols that follow the SSD (i.e., "JK"), and again uses the "AB" symbol as the SFD. In this case also, RX_DV may be asserted with the detection of the SFD. From block 1242, control continues as previously described.

Note that the invention also contemplates various other appropriate known unscrambled data preamble patterns for transmission of data in LS mode during LSP preamble in order to allow for fast clock recovery, nibble alignment, and descrambler lock by the receiving PHY. For instance, other scrambled or unscrambled sequences that provide the necessary environment and time for the receiver to recover clock and align with incoming data during LSP preamble may be used.

i. LS Modified MII Control and Registers

FIG. 8 is an example of a register bit map of an LS modified Media Independent Interface (MII) link suspend control and status registers 800 showing link suspend parameters, in accordance with an embodiment of the present invention. The LS modified MII comprises a link suspend message identification (ID) register 802; link partner status register 804; and link suspend control register 806. Each of the three registers has 16 bits (D0 to D15). A "D", followed by the bit number, identifies the bits in the words. The link suspend message identification register 802, comprises the Link Suspend Message Identification 830 in bits D0-10, and reserved bits 828 in bits D1-15. The link partner status register 804, comprises reserved bit 828 in bit D0, LPLSAV 826 in bit D1, LPLS_RX_EN 822 in bit D2, reserved bit 828 in bit D3, LPLSPPeriod 818 in bits D4-5, LPLSPExp 816 in bits D6-7, LPLSPWidth 812 in bits D8-11, LPWakeUpCode 808 in bits D12-14, and reserved bit 828 in bit D15 (note that the "LP" prefix indicates a link partner). Parameters that are received during Auto-Negotiation are stored in the link partner status register 804. For example LPLSAV, LPLSPExp, LPWakeUpCode, LPLSPWidth and LPLS_RX_EN. The link suspend control register 806, comprises LS_TX_EN 829 in bit D0, LSAV 824 in bit D1, LS_RX_EN 820 in bit D2, reserved bit 828 in bit D3, LSPPeriod 732 in bits D4-5, LSPExp 814 in bits D6-7, LSPWidth 734 in bits D8-11, WakeUpCode 810 in bits D12-14, and LSAN 807 in bit D15. Reserved bits 828 may be used to support redundant codes or data or to perform other valid functions such as providing message protocol or control information as necessary.

In accordance with one or more embodiments of the invention, during system operation, a PHY in LS mode should ensure that it observes the Link Partner LSPWidth (LPLSPWidth) parameter 812 which it received during negotiation and sets its transmitted LSP pulse width, LSPWidth 734, accordingly. The timer-reload value, also referred to as LSPExp 814, is set from the parameters received from the remote partner PHY. The link partner LSPExp (LPLSPExp) 816 and link partner LSPPPeriod (LPLSPPeriod) 818 values received by a PHY ensure that the LSP receive timer performs correctly in accordance with the timing of the partner PHY's transmitter functions.

In the invention, according to an embodiment, the LSPPeriod and LSPWidth values are advertised to the link partner during auto-negotiation when LSAN 807 is set. For PHYs that implement the transparent detect method described earlier without using the Next Page Auto-Negotiation, the default LSP parameter values are assumed (indicated in the Link Suspend Code Word earlier). The link partner should ensure that it observes the LSPWidth parameter received and sets its LSP pulse width accordingly. The same applies to the LS_RX_EN parameter. Thus, the remote PHY upon receiving LS_RX_EN may set its LSP transmit mode accordingly. For example, if the Link Partner LS_RX_EN is false, the PHY should not transmit LSPs to the partner PHY even though link suspend is in effect.

In an embodiment of the invention, in order to ensure a valid link is still present, each PHY must implement a counter for timing the arrival rate of LSPs when link-suspend mode is active. If the timer expires, the flag LINK_STATUS is reset to not OK and the PHY will reset back to the no-connect state (e.g., Auto-Negotiation state 410 of FIG. 4). Both the LSPPeriod 732 and LSPWidth 734 values may be advertised during auto-negotiation with a link partner.

j. LSP Transmit Only Mode

In an embodiment, it may be desirable or necessary to only have one of the PHYs generate LSPs, and the other continue in a non-LS transmit mode. For instance, a PHY generating LSPs may wish to receive 100BASE-TX scrambled idle sequences instead of LSPs. Consequently, the receive circuits of the PHY receiving the standard idle sequences remain in normal IEEE 802.3 operation and are able to instantly receive a Wake-On Lan (WOL) frame. In order to implement LSP transmit only mode, the LS_RX_EN control flag or bit 820 may be used in Auto-Negotiation Next Page (explained below) to allow a PHY to advertise to its link partner that it requires the link partner to always transmit standard idle sequences as opposed to LSPs. Note that setting the LS_RX_EN flag to false tells the link partner that the PHY is not able to receive link suspend pulses. Likewise, the LPLS_RX_EN control flag 822, allows the link partner to advertise the same requirement in return, if necessary.

According to an embodiment, transmitting LSPs while requesting normal continuous idle streams can be used by the LS capable NIC PHY communicating with an LS capable Switch PHY, so that an incoming WOL packet received by the NIC PHY is not missed in 100BASE-TX transmit mode due to the receiver circuits (PLL and equalizer) not being able to quickly lock onto the incoming packet and resynchronize the scrambler. Note that lower power consumption may still be realized in the LSP transmitting NIC PHY, but not in the normal idle transmitting LS capable Switch PHY.

k. Next Page Auto-Negotiation of Link Suspend

In an embodiment, during the auto-negotiation state 410, the PHY and partner PHY may indicate their ability to support link-suspend state 430 through Auto-Negotiation Next Page functions. Auto-negotiation Next Page permits additional parameters to be exchanged with the remote PHY, allowing reconfiguration of those parameters along with indications of the higher layer wake-up modes employed within the node. Use of Next Page requires a simple extension to the IEEE 802.3 Auto-Negotiation standard to recognize the link-suspend Next Page message ID. For example, the message ID may be temporarily set to #20Hex, although other appropriate values may also be used (e.g., as a result of any standardization efforts). Further, a control bit may be present to enable or disable the link-suspend auto-negotiation capability described within. As illustrated in FIG. 8, a control bit, Link-Suspend Auto-Negotiation (LSAN) 807, is identified for this purpose. Moreover, PHY Wake Up Code 810 and link partner Wake Up Code 808 can be contained in the registers allowing either PHY to notify the other PHY of the type of packet the PHY needs to be sent to be woken up (for instance out of a WOL suspended mode).

According to an embodiment, following a reset, if LSAN 807 is set, then the PHY will support the Next Page Link Suspend Auto-Negotiation scheme. LSAN 807 may default to off (false) following a power on reset, but may not be affected by a soft reset to support Next Page auto-renegotiation of LS mode. Hardware control pins may be implemented that allow the default value of LSAN to be set to facilitate applications that do not wish to use higher layer software to change this setting (e.g. multi-port PHYs in switch applications).

As mentioned above, a mechanism, referred to herein as Next Page, may be used for passing operational parameters between PHYs during link negotiation. The IEEE 802.3 Auto-Negotiation standard, as described in IEEE 802.3 Standard for CSMA/CD Access method and Physical Layer Specifications, Section 28.2.3.4, is one example of such a mechanism, but other valid ones may also be implemented. As governed by the existing IEEE standard, support of a link-suspend parameter exchange requires the assignment of a link-suspend Next Page Message ID. A control register, link-suspend message ID (LSMsgID) 830, is identified for setting the Next Page message ID parameter. This may either be a hardwired value within the PHY or a programmable register that may be setup by the controller interfacing to the PHY (e.g., see the LS modified MII registers above).

Figure 9:
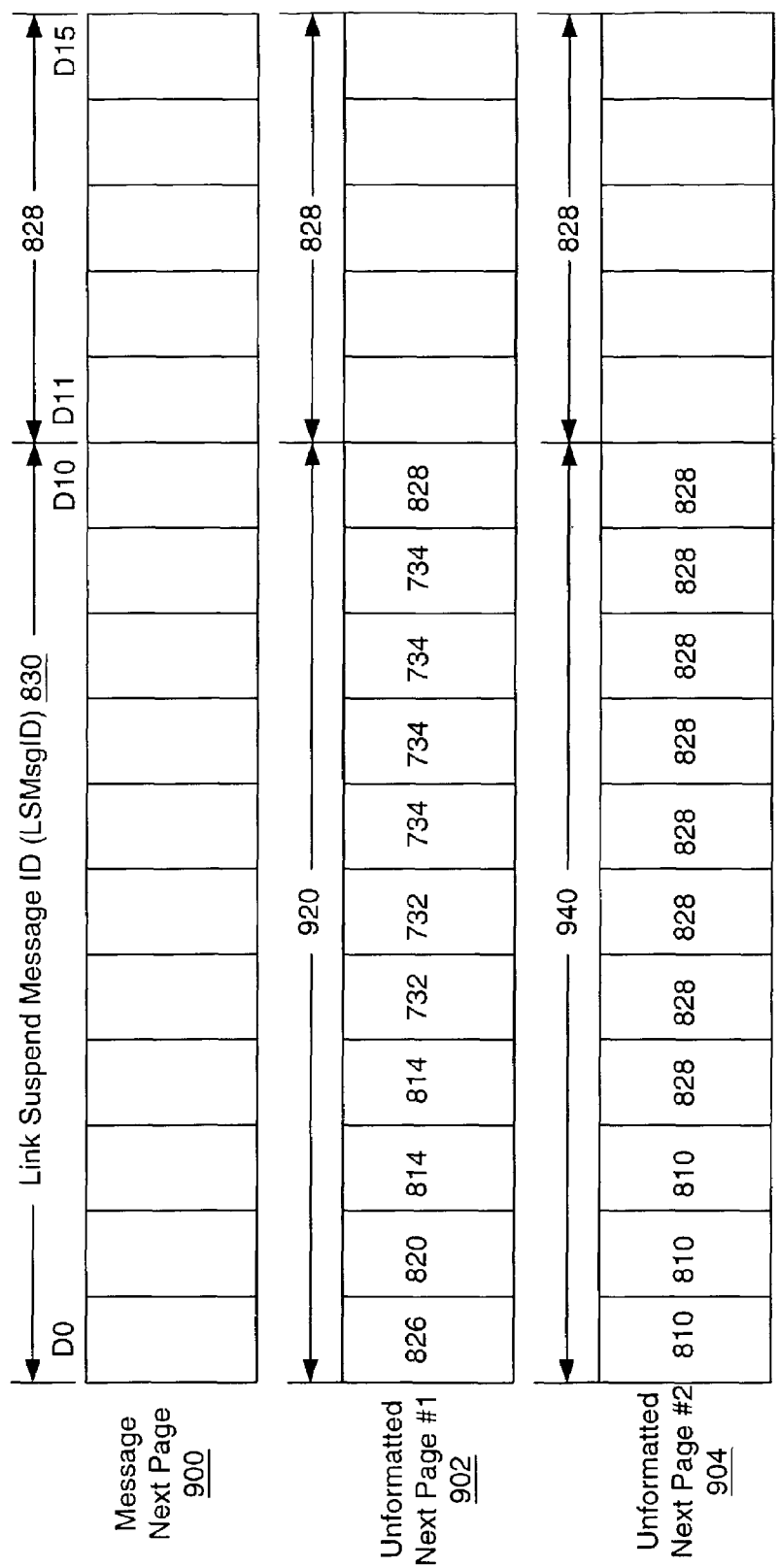
FIG. 9 is a register bit map of an Auto-Negotiation message Next Page and example link suspend Next Page code words, in accordance with an embodiment of the invention.

FIG. 9 is a register bit map of an Auto-Negotiation message Next Page and example link suspend Next Page code words, in accordance with an embodiment of the invention. In this example, an unformatted Next Page #1

902, and unformatted Next Page #2 904, are shown following the message Next Page 900. Here, using the IEEE standard, the Next Page scheme provides a means of transmitting 16-bit Next Page words (900, 902, and 904, either Message or Unformatted Next Pages) to a partner PHY. Although the Next Page scheme is described here, various other appropriate combinations of registers may be used for link negotiation.

The Auto-Negotiation Message Next Page 900, comprises a Link Suspend Message ID (LSMsgID 830) in bits D0-10, and reserved bits 828 in bits D11-15 for providing message parameters and control (e.g., Next Page flags). The 11-bit Link Suspend message ID indicates that further pages to follow provide additional link-suspend code words in the unformatted code word format.

The unformatted Next Page #1 902, comprises the 11-bit link suspend code word 920, and reserved bits 828 in bits D11-15 for providing message parameters and control (e.g. Next Page flags). Similarly, the unformatted Next Page #2 904, comprises the 11-bit link suspend code word 940, and reserved bits 828 in bits D11-15 for providing message parameters and control (e.g. Next Page flags).

The link-suspend code word 920, provides the basic parameters used to set up link suspend operation 430. Link-suspend code word 940, is optionally sent, only if a bit field of the first link-suspend code word is set, indicating there is further information to be sent. Examples of parameters sent in the two code words, according to an embodiment, are described below. The bits in the words are recognized by a "D", followed by the bit number as illustrated in FIG. 9.

Link-suspend Code Word 920 (D0-D10)
bit D0=LSAV 824
    value 0=Link-suspend Not Enabled (but PHY is capable)
    value 1=Link-suspend Capable (enabled if both link partners are capable).
bit D1=LS_RX_EN 820 (receive capability)
    value 0=PHY can only receive in standard mode only (remote PHY must ensure that when it sees this it does not transmit LSPs during link-suspend idle state);
    value 1=PHY is capable of receiving LSPs.
bits D2-D3=LSPExp 814 (LSP receive timeout)
    value 0=2×LSPPeriod value (default)
    value 1=3×LSPPeriod value
    value 2=4×LSPPeriod value
    value 3=off (never times out)
bits D4-D5=LSPPeriod 732 (LSP pulse spacing)
    value 0=512 ms (default)
    value 1=2×512 ms
    value 2=3×512 ms
    value 3=4×512 ms
bits D6-D9=LSPWidth 734 (minimum pulses width required by this PHY to operate)
    value 0=16 symbols (default)
    value n=(n−1)×16 symbols (where n=2-15)

(Optional) Link-suspend Code Word 940 (D0-D10)
bits D0-D2=WakeUpCode 810 (see examples below)
bits D3-D10=reserved 828

Note that these are example assignments and values only. Various other appropriate message, word, and bit combinations may be used for varying implementations of link-suspend.

1. Wake-Up Codes

In an embodiment, a PHY may use a second link-suspend code word 940, during auto-negotiation 410, to advertise additional parameters to remote partner PHYs. For example, three bits of Link Suspend Code Word 940 may be reserved for indicating the packet required by the node to "wake up" from a sleep state or to perform Wake-On LAN (WOL) operations. The network operating system driver is required in this case to write a meaningful value to the WakeUpCode field 810 of a register within the PHY device. This capability permits an LS Switch PHY to recognize, which end stations or attached partner LS NIC PHYs are sleep capable, along with what packet types or link conditions can be used to wake up each sleep capable node, without the need or intervention of higher layer protocols. The switch may use the codes to employ additional filtering schemes (that recognize the appropriate packet required by a sleeping node) thereby preventing unscreened packets from reaching the end station unless they meet the WOL criteria (i.e. are the appropriate wake up packet).

For an embodiment, example Wake-Up codes 810 may be as follows:
=000 Not defined (NIC—default)
=001 Originator of wake up packet (normally a switch port)
=010 Wakeup using Link Status change
=011 Wakeup using Magic Packet
=100 Wakeup using Masked Packet (e.g. OnNow)
=101-110—User defined
=111—Reserved for future use (e.g. Wake up code expansion control word in a further link suspend code word)

For this embodiment, a code value of zero simply means the software has left the Wake-Up code undefined. Thus, none-zero values are advertised by a NIC supporting a form of sleep mode that requires a wakeup packet to resume operation. Note that a switch is usually the originator or forwarder of the wake up packet, with WakeUpCode=001. Also, note that where both PHYs WakeUpCodes are non-zero, either node may be woken up or originate wake-up frames (e.g. switch-to-switch connections). Thus, the link-suspend scheme is programmable and facilitates adjustment of key operational parameters, such as wake-up codes, to enable fine-tuning to match an application's particular needs and intensity of data traffic.

According to an embodiment, an additional benefit of the invention is that a network manager may poll the switches in a network and determine which PC/workstations are currently sleeping, awake or turned off completely, by interrogating the switch management information base (MIB), independent of the PC/workstations being awake or not. Here, the LSAV and LPLSAV flags, which are used internally by the PHY, can also be made available to the MAC or Switch after link negotiation. Thus, the MAC level controller can determine if a link has link suspend-capable devices by polling a link-suspend available (LSAV) status bit via the LS modified MII register, and store the result in a MIB register for system level access.

Similarly, an embodiment allows more intelligent and power sensitive network devices (e.g. switch/hub devices) to be manufactured that can recognize a sleep capable node without the need for higher-level protocol support. The recognition may be supported through a low-level mechanism for passing link power management parameters and WOL operational modes between WOL capable network devices. In the example of a PC LAN adapter and a LAN switch or hub device, the switch can simply read a PHY register (LPLSAV in the LS modified MII) to determine if a remote partner PHY (and NICs) has sleep or WOL capability. Moreover, an embodiment allows a switch receiving enough LSPs to indicate that its remote partner is asleep, to poll the switch manager to determine what type of wake up packet to send to wake up the sleeping partner node, by reading the sleeping partner's wake up code register.

m. Invention Construction

Figure 2:
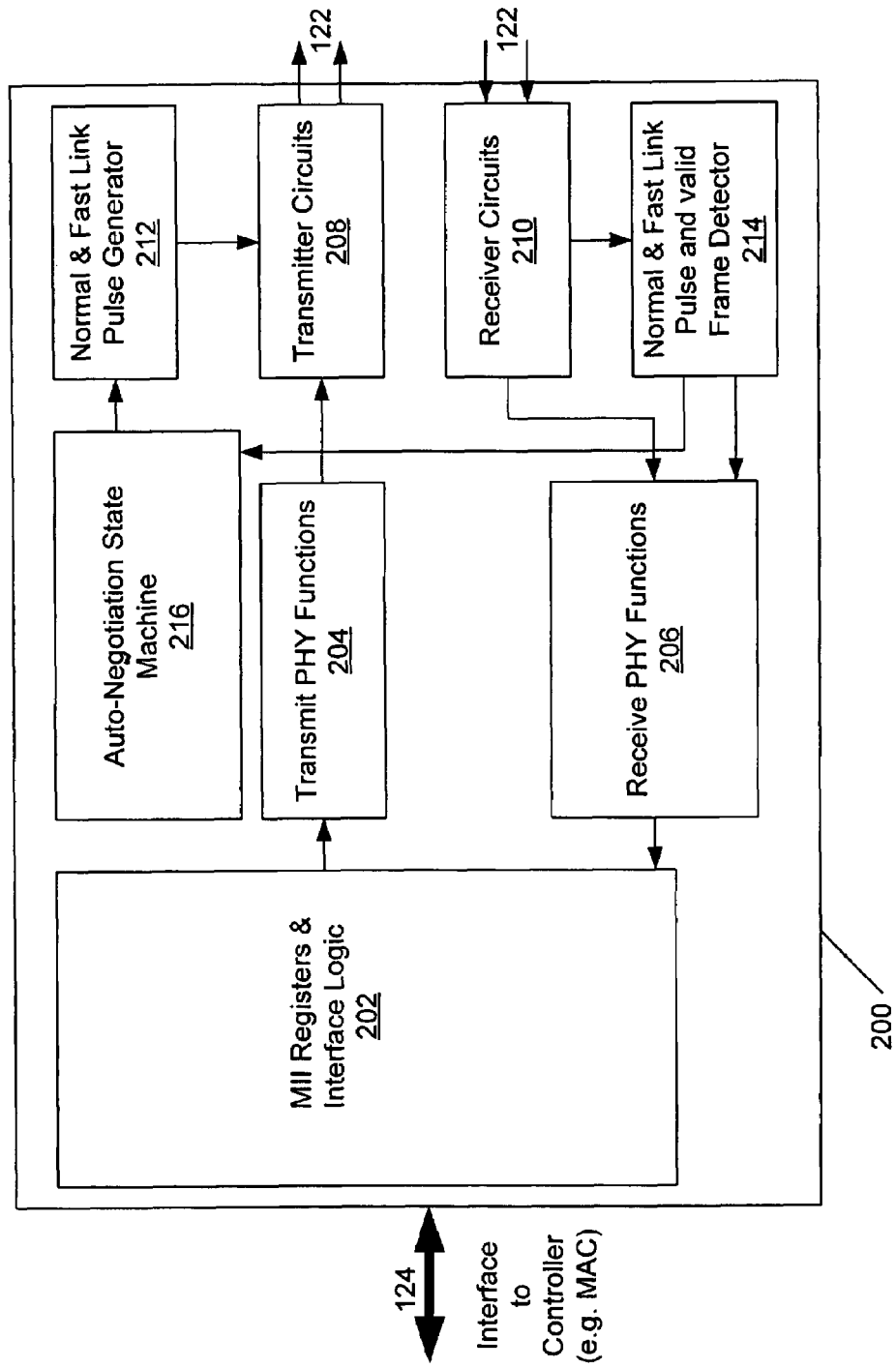
FIG. 2 is a block diagram of a typical prior physical layer device (PHY) system showing key functional components.
Figure 3:
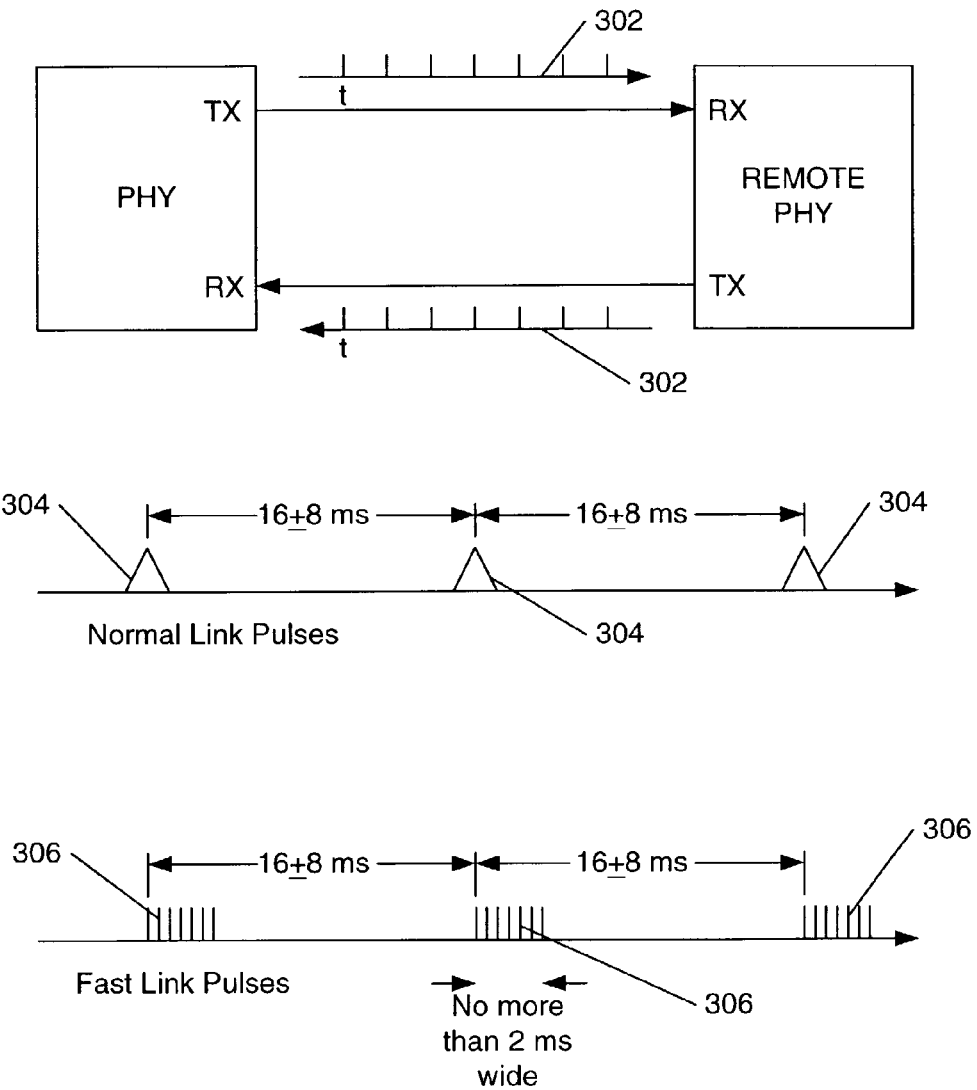
FIG. 3 is a waveform diagram of link negotiation pulses showing NLPs and FLPs.
Figure 10:
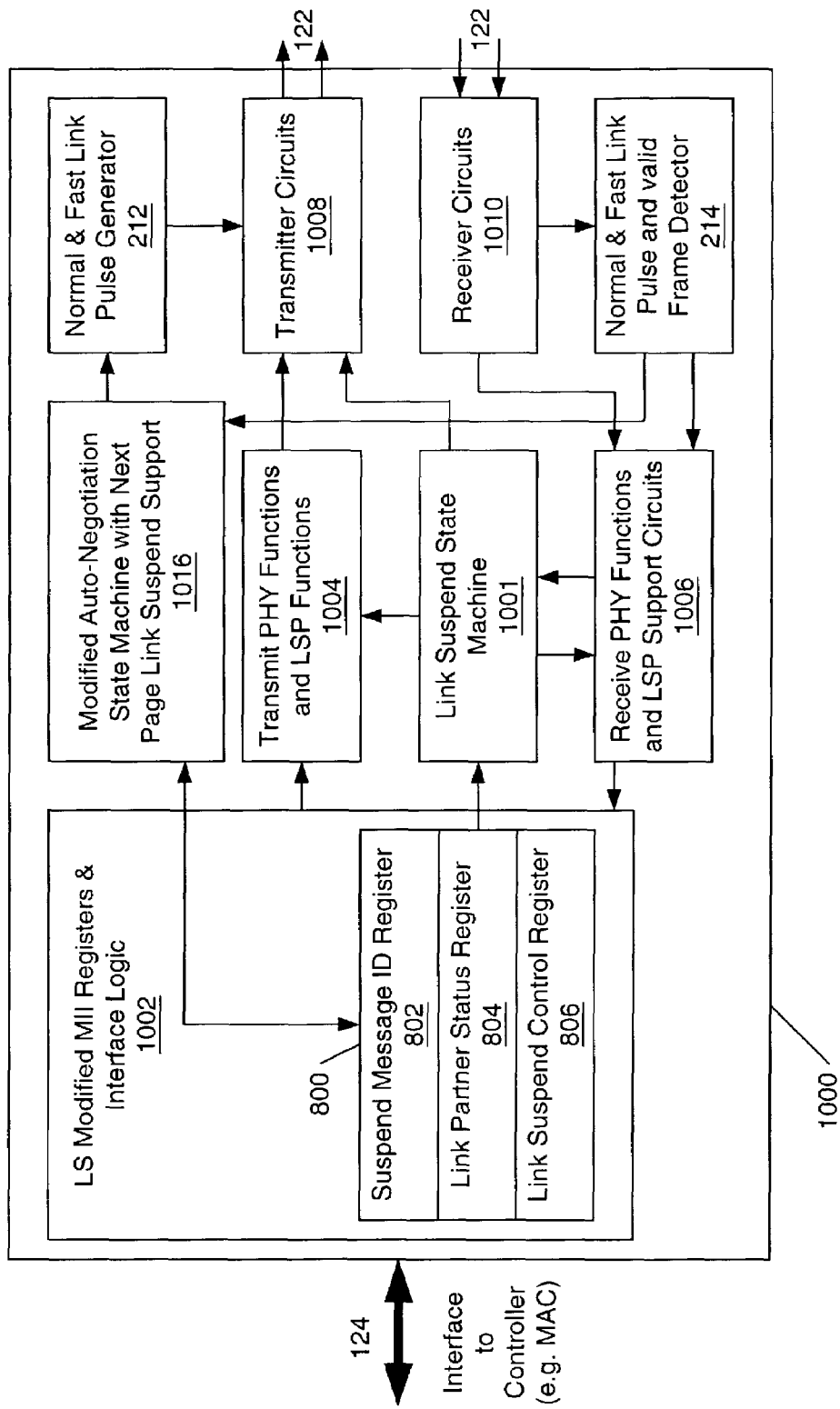
FIG. 10 is a general block diagram illustration of a network PHY modified for Link Suspend capability, in accordance with an embodiment of the invention.

FIG. 10 is a general block diagram illustration of a network PHY modified for Link Suspend capability, in accordance with an embodiment of the invention. As illustrated, a standard PHY requires several changes in order to support the additional LS negotiation, mode, and states. Also, implementing the invention as an enhancement to a standard PHY facilitates backwards compatibility. Thus, FIG. 10 illustrates the high level PHY functions that may be modified to create an LS capable PHY from a prior art PHY, e.g., from a typical prior art PHY 200 shown in FIG. 2, to an LS capable PHY 1000 shown in FIG. 10.

FIG. 10 illustrates an embodiment comprising an LS Modified MII Registers and Interface Logic component 1002, connected to a Link Suspend State Machine 1001, a Transmit PHY Functions and LSP Functions component 1004, a Receive PHY Functions and LSP Support Circuits component 1006, and a Modified Auto-Negotiation State Machine with Next Page Link Suspend Support 1016. In turn, the Link Suspend State Machine 1001 is also connected to the Transmit PHY Functions and LSP Functions component 1004, a modified LS capable Transmitter Circuits 1008, and the Receive PHY Functions and LSP Support Circuits component 1006. The transmit PHY functions and LSP function component 1004, is connected to modified LS capable transmitter circuits 1008. Likewise, the receive PHY functions and LSP support circuits component 1006, is connected to a Normal and Fast Link Pulse and Valid Frame Detector 214, and a modified LS capable Receiver Circuits 1010. The modified LS capable transmitter circuits 1008, is connected to a normal and fast link pulse generator 212. The modified LS capable receiver circuits 1010, is connected to the normal and fast link pulse and valid frame detector 214. The modified auto-negotiation state machine with Next Page link suspend support 1016 is also attached to the normal and fast link pulse generator 212, and the normal and fast link pulse and valid frame detector 214.

In an embodiment, the link suspend state machine 1001 provides overall control of the link suspend functions of the system. The state machine may be a standalone state machine as shown in FIG. 10, or integral to the receive or transmit PHY function components, which may also be state machines.

Likewise, according to an embodiment, the LS modified MII Registers and Interface Logic component 1002, provides a common interface for connecting the LS capable PHY 1000 with different types of standardized MACs so that different vendors can design standardized products that will successfully interface with the LS capable PHY. For example, devices supporting the link suspend modes may be pin compatible with the existing PHY chip devices, allowing products with the existing chip devices to later upgrade in hardware, or migrate in design to a low power LS version in order to support LS mode without hardware or board level changes. However, various other appropriate PHY interfaces, such as RMII, SMII, GMII, for example, may also be used.

Additional control and status registers 800 may be located in the LS modified MII registers and interface logic component 1002 to monitor and control link suspend operation. For example, a Link Suspend Control 806, Link Suspend Partner Status 804, and Link Suspend Message ID 802 registers may be employed having bit significance as shown in FIG. 8.

Further, in the invention according to one embodiment, the modified auto-negotiation state machine and associated logic 1016, may support recognition of and provision of various parameters of a link suspend partner PHY. For example, the modified auto-negotiation state machine with Next Page link suspend support 1016 may provide pulse width control to pulse generator 212 and recognize from the frame detector 214, various parameters used to initiate and control communications and link suspend operations. Thus, the modified auto-negotiation block is responsible for negotiating with its remote LS capable PHY partner to achieve the desired communication modes.

For instance, the modified auto-negotiation state machine may transfer and/or receive parameters that alter the behavior of an LS PHY's receiver in order to match the characteristics of a partner LS PHY's transmitter; or to dictate a specific link-suspend mode necessary for the an LS PHY's receiver circuits to operate correctly.

The transmit PHY functions and LSP function component 1004, controls the modified LS capable transmitter circuits 1008, which transmit across the wired link 122. Likewise, the receive PHY functions and LSP support circuits component 1006, controls the modified LS capable receiver circuits 1010, which receive data from the wired link 122. The normal and fast link pulse generator 212 provides the timing pulses for the modified LS capable transmitter circuits 1008. Similarly, the normal and fast link pulse and valid frame detector 214 provides receipt triggering for the modified LS capable receiver circuits 1010.

The modified transmitter function 1004 and associated circuits 1008 support the generation of link suspend packets and the ability to save power when transmitting link suspend packets between periods of silent line state as compared to standard idle state transmissions. Additionally, the transmitter circuit supports switching off of the majority of the powered up circuits between link-suspend pulses (i.e., during SLS) in order to reduce the average power consumption of the PHY to a minimum, as illustrated in FIG. 7.

Additionally, the modified receiver function 1006 and associated circuits 1010: (1) support detection of valid link suspend packets, (2) detects loss of link suspend packets by timing the interval between valid link suspend packets, and (3) recovers from silent line state 440, upon receipt of a valid packet or frame without the loss of the incoming data.

Although certain embodiments have been described, the invention provides full inter-operability with prior and current network devices when the link suspend features are disabled and will only use link suspend features with another network device having some of the similar capabilities. Thus, connection of an LS capable PHY device in a network should be transparent.

The physical layer link suspend operation described above is for purposes of example only. An embodiment of the invention may be implemented in any type of network method, apparatus, device, mode, state, in any network environment, or across any network media. For example, it may be used as a stand-alone system, or the apparatus may be coupled to other similar apparatus, PHY, or network device across any type of network (e.g., LAN, WAN, PSTN, Internet, Cable TV, cellular, satellite, etc.), or any combination thereof.

Thus, a method and apparatus for handling link suspend packets and silent line state transitions of a network device operating in link suspend mode have been described. Particular embodiments described herein are illustrative only and should not limit the present invention thereby. The invention is defined by the claims and their full scope of equivalents.

The invention claimed is:

1. An apparatus, comprising:
   a first device of a plurality of network devices, each one of said plurality of network devices having a receiver function and a transmitter function, said receiver function including a descrambler;
   a second device of said plurality of network devices;
   a communications link coupling said first device to said second device such that said first device and said second device are link partners, said link partners operating in a plurality of communication modes, said plurality of communication modes including at least a link suspend mode and a standard protocol mode, said standard protocol mode requiring frequent communication signals between said link partners to maintain said communications link, wherein said link suspend mode comprises sending at least one link suspend packet between periods of silent line state to maintain said communications link between said link partners during periods of no data transmission, said at least one link suspend packet compriing a preamble sequence having a predictable pattern, said preamble sequence unlocking said receiver function's descrambler; a scrambled idle sequence for preparing said receiver function for the silent line state; and a termination sequence for signaling entry into the silent line state.

2. The apparatus of claim 1, wherein said transmitter function of at least one of said link partners is shut down during the silent line state.

3. The apparatus of claim 1, wherein said receiver function of at least one of said link partners is shut down during the silent line state.

4. The apparatus of claim 1, wherein said preamble sequence of said at least one link suspend packet is unscrambled.

5. The apparatus of claim 1, wherein said preamble sequence of said at least one link suspend packet is compatible with said standard protocol's requirement for data preamble.

6. The apparatus of claim 1, wherein said scrambled idle sequence of said at least one link suspend packet is compatible with said standard protocol mode.

7. The apparatus of claim 1, wherein said termination sequence is not used by said standard protocol mode.

8. The apparatus of claim 1, wherein said link partners are communicating in said link suspend mode over said communications link.

9. The apparatus of claim 8, further comprising a transmit enable signal in said first device to indicate availability of data for transmission from said first device to said second device.

10. The apparatus of claim 9, wherein assertion of said transmit enable signal causes said transmitter function of said first device to send a data preamble followed by said data to said second device.

11. The apparatus of claim 10, wherein composition of said data preamble depends on the communication state of said transmitter function of said first device when said transmit enable signal is asserted.

12. The apparatus of claim 11, wherein the communication state comprises:
   a standard idle state;
   the silent line state; and
   a link suspend pulse state.

13. The apparatus of claim 12, wherein said data preamble comprises said standard protocol's preamble when said transmitter function is in said standard idle state.

14. The apparatus of claim 12, wherein when said transmitter function is in the silent line state, said data preamble comprises:
   said at least one link suspend packet;
   a scrambled idle sequence;
   a start of stream sequence; and
   a start of frame sequence.

15. The apparatus of claim 12, wherein when said transmitter function is in said link suspend pulse state, said data preamble comprises:
   the remaining portion of said at least one link suspend packet;
   a scrambled idle sequence;
   a start of stream sequence; and
   a start of frame sequence.

16. A method for handling link suspend pulse and silent line state transitions of a network device operating in link suspend mode, said method comprising the steps of:
   connecting a plurality of network devices, each one of said plurality of network devices having a receiver function and a transmitter function, said receiver function including a descrambler;
   creating a communications link by coupling a first device of said plurality of network devices to a second device of said plurality of network devices such that said first and second devices are link partners;
   configuring said link partners to operate in a plurality of communication modes, said plurality of communication modes including at least a link suspend mode and a standard protocol mode;
   transmitting frequent communication signals between said link partners to maintain said communications link when operating in said standard protocol mode;
   maintaining said communications link by periodically transmitting link suspend packets between periods of silent line state when operating in said link suspend mode, said transmitted link suspend packets serving to train said receiver functions, wherein each of said link suspend packets comprises:
   a preamble sequence having a predictable pattern, said preamble sequence unlocking said receiver function's descrambler;
   a scrambled idle sequence for preparing said receiver function for the silent line state; and
   a termination sequence for signaling entry into the silent line state; and
   transmitting data packets from said first device to said second device when said data packets become available for transmission to said second device without losing said data packets during transmission.

17. The method of claim 16, wherein said transmitter function of at least one of said link partners is shut down during the silent line state.

18. The method of claim 16, wherein said receiver function of at least one of said link partners is shut down during the silent line state.

19. The method of claim 16, wherein said preamble sequence of at least one of said link suspend packets is unscrambled.

20. The method of claim 16, wherein said preamble sequence of at least one of said link suspend packets is compatible with said standard protocol's requirement for data preamble.

21. The method of claim 16, wherein said scrambled idle sequence of at least one of said link suspend packets is compatible with said standard protocol mode.

22. The method of claim 16, wherein said termination sequence is not used by said standard protocol mode.

23. The method of claim 16, wherein said link partners are communicating in said link suspend mode over said communications link.

24. The method of claim 23, further comprising a transmit enable signal in said first device to indicate availability of data for transmission from said first device to said second device.

25. The method of claim 24, wherein assertion of said transmit enable signal causes said transmitter function of said first device to send a data preamble before sending said data to said second device.

26. The method of claim 25, wherein composition of said data preamble depends on the communication state of said transmitter function of said first device when said transmit enable signal is asserted.

27. The method of claim 26, wherein the communication state comprises:

a standard idle state;

the silent line state; and a link suspend pulse state.

28. The method of claim 27, wherein said data preamble comprises said standard protocol's preamble when said transmitter function is in said standard idle state.

29. The method of claim 27, wherein when said transmitter function is in the silent line state, said data preamble comprises:

at least one of said link suspend packets;

a scrambled idle sequence;

a start of stream sequence; and a start of frame sequence.

30. The method of claim 27, wherein when said transmitter function is in said link suspend pulse state, said data preamble comprises:

the remaining portion of at least one of said link suspend packets a scrambled idle sequence;

a start of stream sequence; and a start of frame sequence.

* * * * *